HOWARD W. BECKWITH
ROBERT E. McCOY
INVENTORS

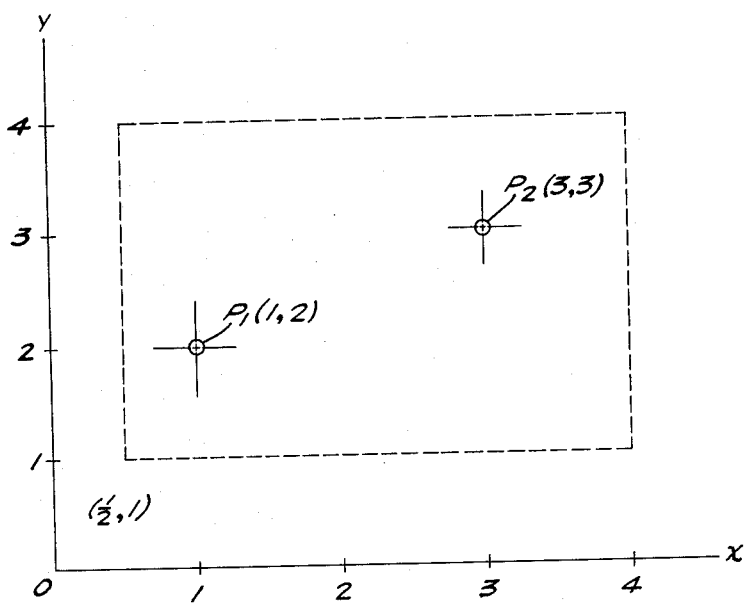
FIG. 1.B
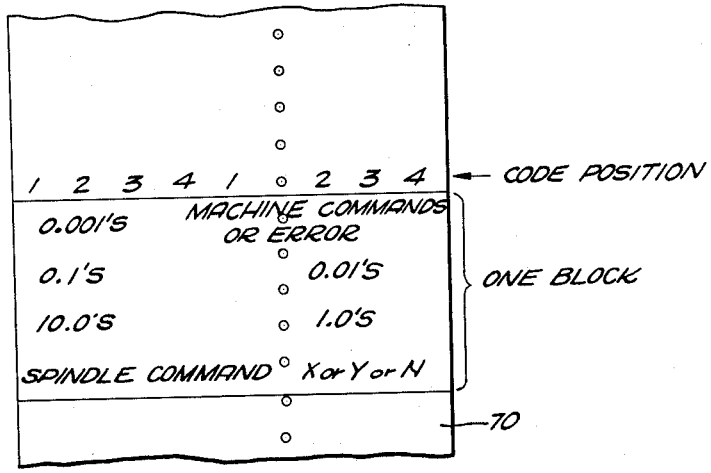
FIG. 3.
FIG. 4.
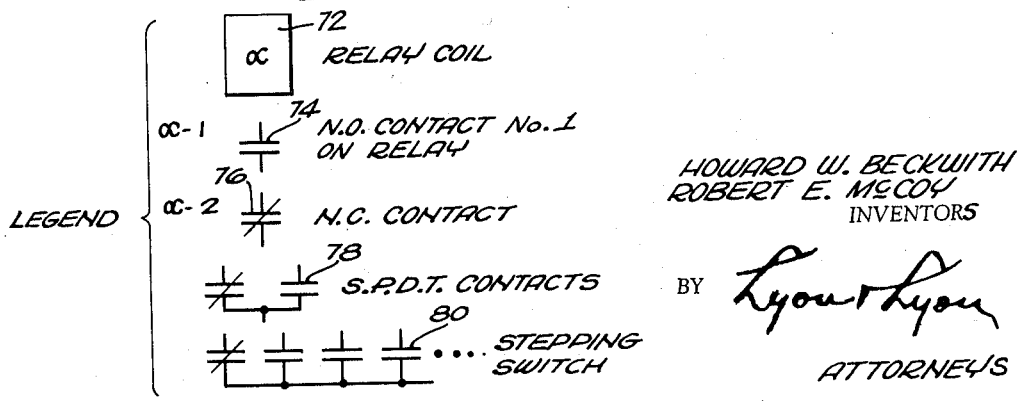
HOWARD W. BECKWITH
ROBERT E. McCOY
INVENTORS
BY Lyon & Lyon
ATTORNEYS

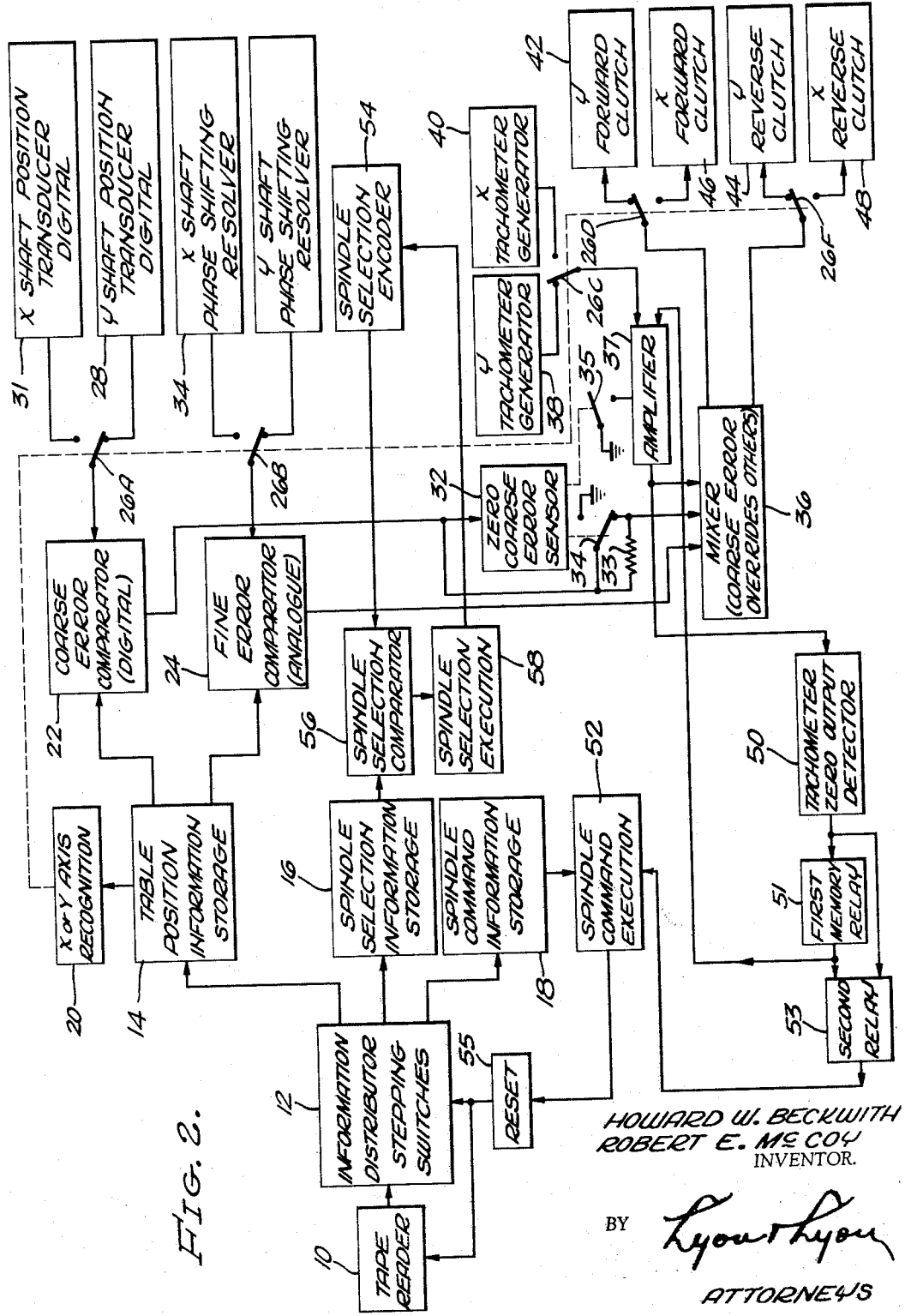

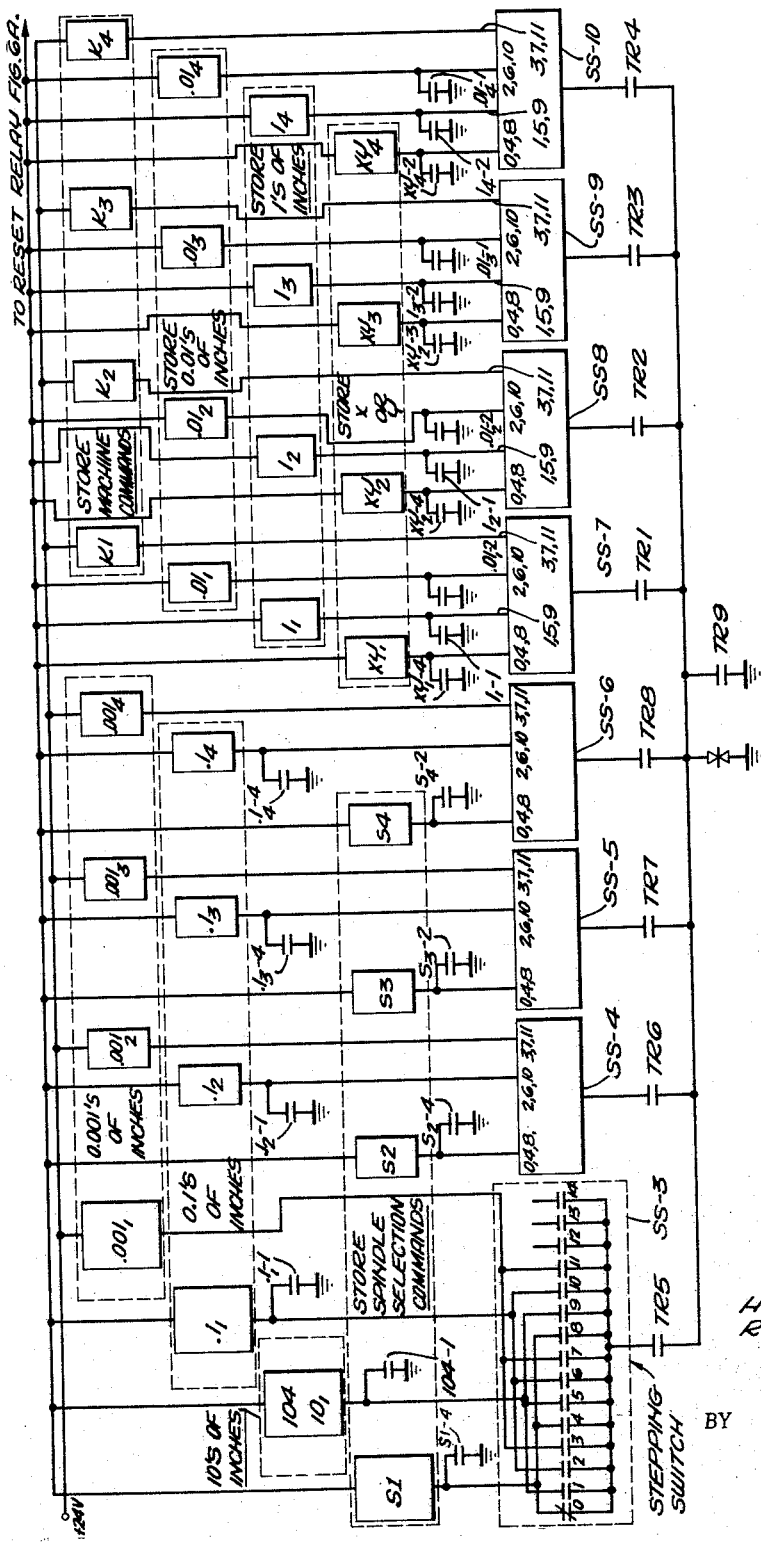

BY Lyon Lyon
ATTORNEYS

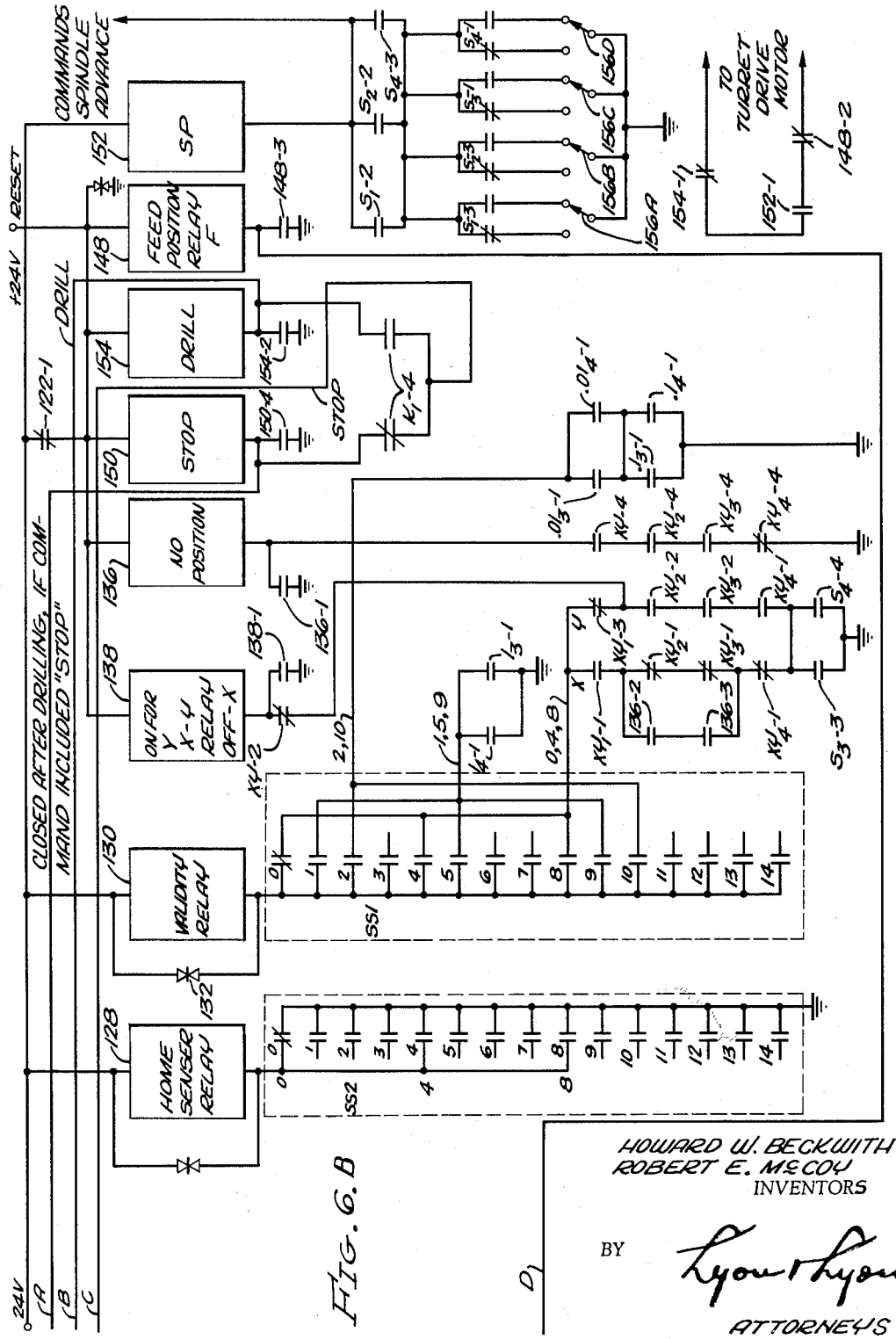

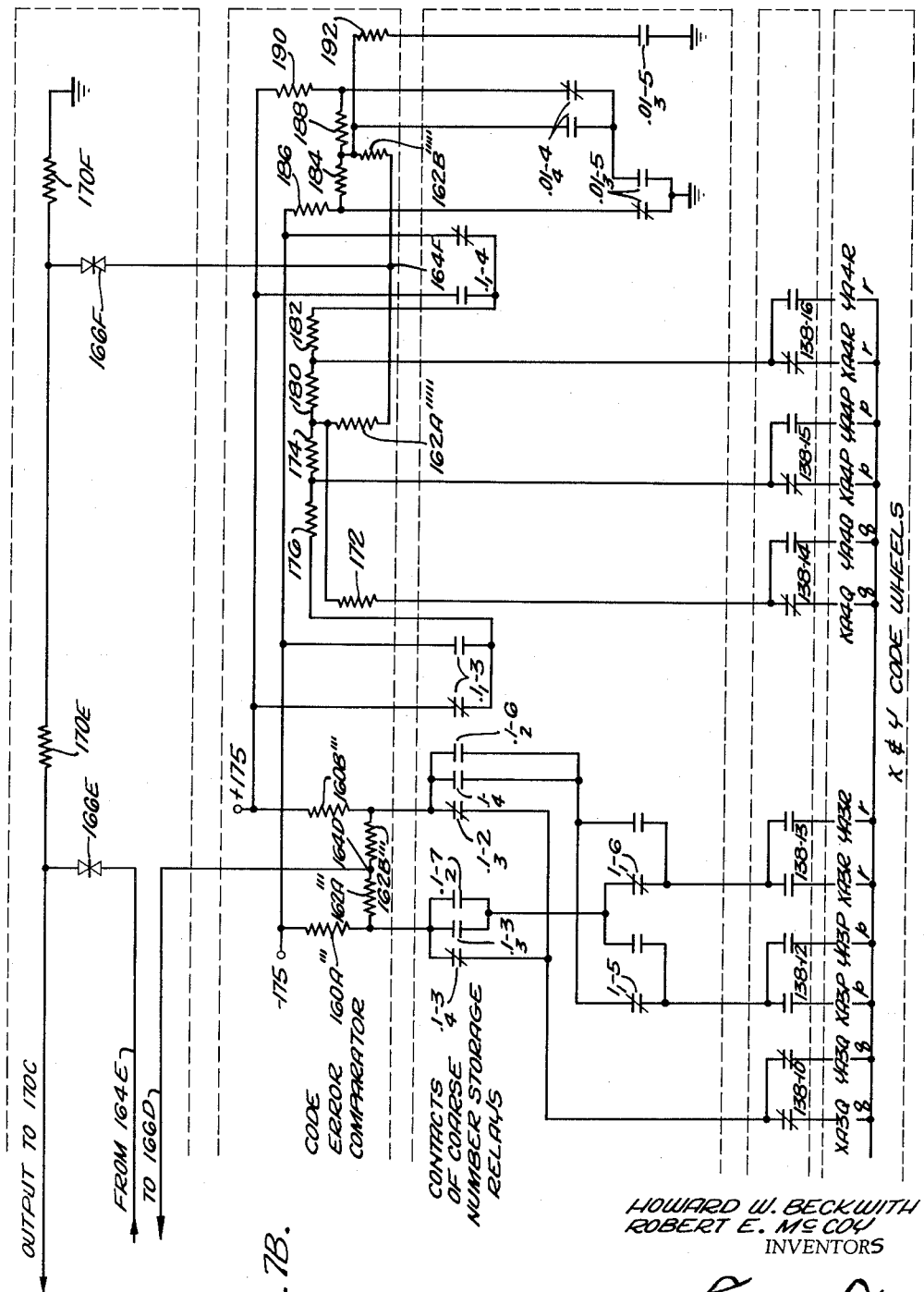

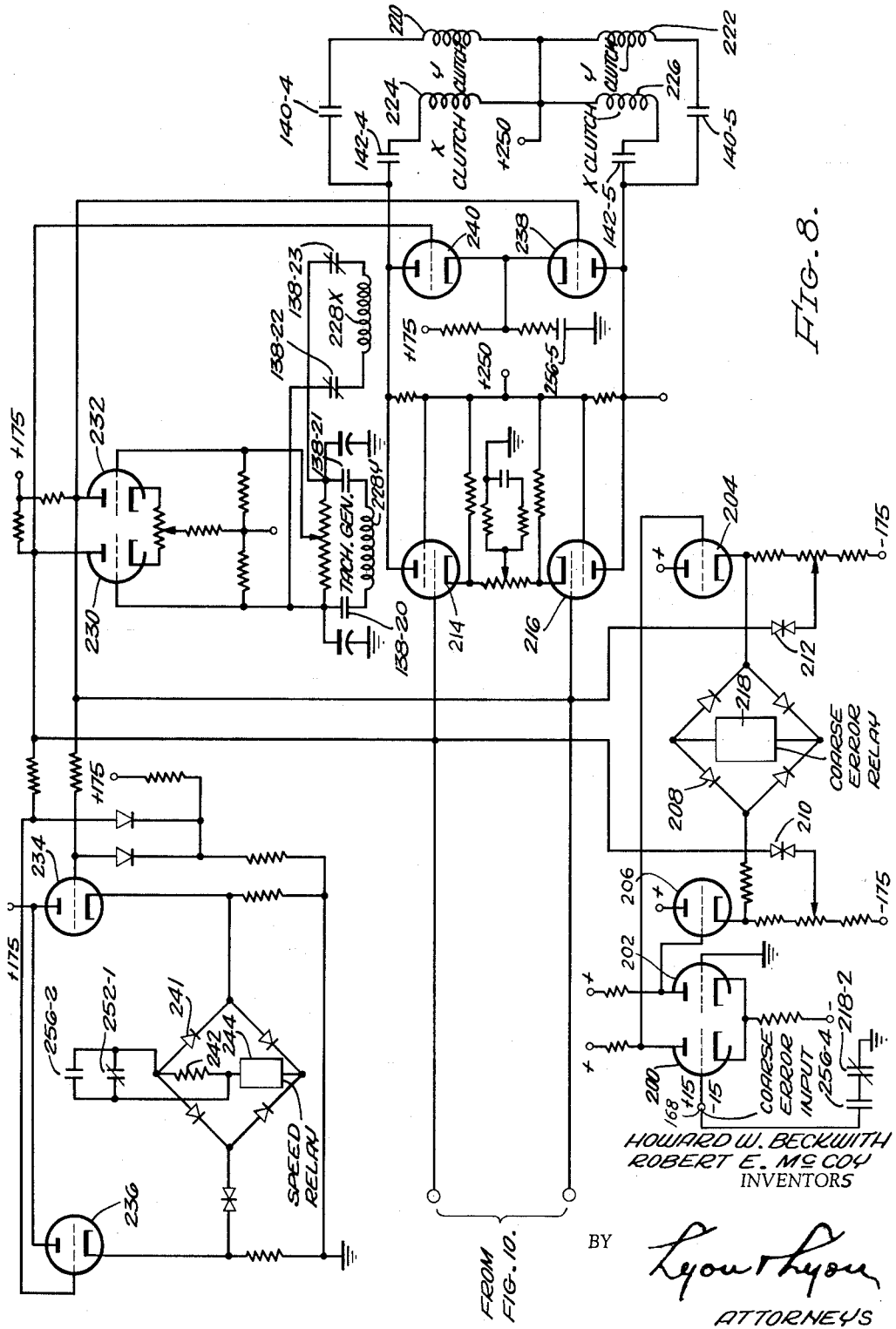

Nov. 13, 1962 H. W. BECKWITH ETAL 3,063,311
CONTROL SYSTEM
Filed Dec. 16, 1957 10 Sheets-Sheet 10

HOWARD W. BECKWITH
ROBERT E. McCOY
INVENTORS

BY Lyon & Lyon
ATTORNEYS

United States Patent Office 3,063,311
Patented Nov. 13, 1962

3,063,311
CONTROL SYSTEM
Howard W. Beckwith, Santa Monica, and Robert E. McCoy, Los Angeles, Calif., assignors, by mesne assignments, to General Electric Company, a corporation of New York
Filed Dec. 16, 1957, Ser. No. 703,100
9 Claims. (Cl. 77—32.2)

This invention relates to electrical control systems for automatically controlling the operation of a machine tool and, more particularly, to an improved point-positioning type of electrical control.

The operation of drilling and tapping a workpiece is usually carried out by employing an automatic drill press, which may or may not have multiple spindles. The usual type of automatic drill press has a table upon which the workpiece is fastened. Locations on the workpiece for drilling are obtained by moving the table. The table will be mounted to be driven along one axis by one lead screw and along the axis at right angles thereto by a second lead screw. These lead screws may be hand or motor driven. When the point of the workpiece at which drilling is desired is positioned under the spindle, the spindle is lowered, the drilling proceeds, and then the spindle is returned. The table can then be moved by means of the drives along its axes to the next position.

The type of operation employed in positioning the workpiece underneath the spindle of the drill press is known as point positioning.

An object of the present invention is the provision of novel point-positioning control apparatus.

Another object of the present invention is the provision of useful point-positioning control apparatus.

One of the prime requirements for an automatic point-positioning system is that the operation thereof be sufficiently accurate in accordance with machine-shop requirements. Accordingly, a further object of the present invention is the provision of an accurate and relatively inexpensive automatic point-positioning control system.

These and other objects of the present invention are achieved in an arrangement whereby data for controlling the positioning desired for a machine-tool table is entered onto a data-storage medium, which may be, for example, punched paper tape. The data is entered into the storage medium in a manner so that the position of the table is given, first, along one ordinate, with instructions to the machine tool as to what to do when the table has been moved to that position. This set of instructions is then followed by the instructions as to the position desired for the table along the other ordinate, as well as instructions to the machine tool as to what to do when such position is reached.

A block of the data at a time is read from the storage medium into a storage register. Each block of data consists of the data pertaining to the positioning of the table along one axis, or co-ordinate, and the machine tool instructions when the table has reached such position. Provision is made for recognition of the co-ordinate to which the instructions being read pertain. Provision is also made for ordering the motion of the table to the point along a co-ordinate, designated by the instruction given. When the table reaches that position, this is recognized from data derived from positional transducers attached to the lead screws. Thereafter, the machine tool performs the instructions which have been read out. When these have been completed, the register is cleared and the next block of information is ordered to be read from the storage medium.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1B is a diagram of a two-co-ordinate system shown in order to facilitate an understanding of this invention;

FIGURE 2 is a block functional diagram of the invention;

FIGURE 3 is an exemplification of a typical layout out of a block of data on the tape used in this invention;

FIGURE 4 is a representation of the relay legend employed in the drawings for this invention;

FIGURE 5 is a drawing of the distributor stepping switch contacts and the relay registers used for data and command storage in the embodiment of the invention;

FIGURES 6A and 6B are schematic drawings of the relay arrangement used in the invention for sequencing control;

FIGURES 7A and 7B are schematic diagrams of the coarse error comparator circuit employed in this invention;

FIGURE 8 is a circuit diagram of the zero coarse error senser, the tachometer zero voltage senser, and the mixer;

Figure 1A:
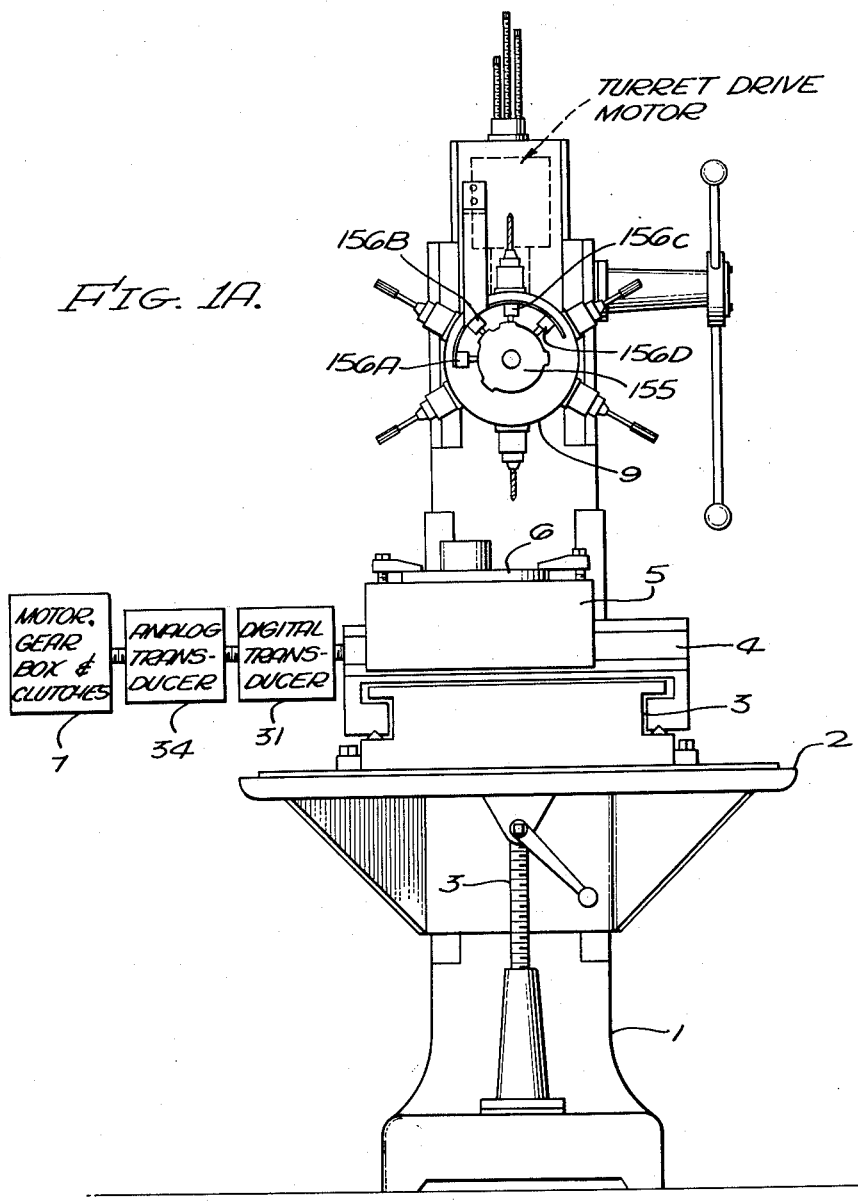
FIGURE 1A illustrates a multiple spindle automatic drill press of the type suitable for use in accordance with this invention.

This invention will be described by way of illustration as controlling the operation of a multiple spindle, automatic drill press of the type illustrated in FIGURE 1A. This, however, is not to be construed as a limitation upon the invention, since it will become apparent that the function of point-position is one which is employed in many other types of apparatuses, and the invention to be described herein can be employed for this purpose with such other apparatuses. Referring now to FIGURE 1A, the illustrative automatic drill press contains a base 1 and a supporting table 2. The supporting table may be adjusted vertically on the base by means of rotating the screw 3. On the supporting table 2, there is positioned slidably a first way 3. A second way 4 is carried by the first way to be slidable at right angles thereto. A table 5 is adjustably attached to the way 4. On the table 5, the workpiece 6, which is to be drilled, is fastened. The first way 3 can be moved along one axis or co-ordinate on guides (not shown), mounted on the fixed table 2. The second way 4 may be moved along a second co-ordinate on guides or tracks, which are mounted on the first way 3.

Means for driving the second way 4 is shown in detail. The means for driving the first way 3 is identical and will not be shown for that reason and to avoid confusion in the drawings. A rectangle 7 contains the drive clutches, a motor, and a gear box. The gear box is coupled to the lead screw 8. An analog transducer 34 and a digital transducer 31 are respectively driven simultaneously with the lead screw 8.

A multiple spindle turret head 9 may be rotatably driven by a turret drive motor, which is located behind the turret head. Raising and lowering mechanism for the multiple spindle head also is well known and will not be described here. An arrangement for indicating which one of the spindles is in the drill position is provided by means of a cam 155, which rotates whenever the turret head rotates. Four switches 156A, 165B, 156C, and 156D are closed or not, as determined by the surface of the cam. For each drill in the operative position, a unique configuration of the open and closed conditions of the four switches is presented, whereby information as to which one of the drills is in position is indicated. The operation of these switches is described in detail subsequently herein. The multiple spindle, automatic drill press has a movable table 5, upon which the workpiece 6 to be drilled is fastened. The table motion is controlled by means of two lead screws, one of which (8) will be hereafter designated as the x-axis lead screw, and the other of which will be hereafter designated as the y-axis lead screw. For the purpose of this invention, it will be assumed that each of these lead screws may be driven in a forward or reverse direction from an electric motor through a gear box, which drives a forward clutch and a reverse clutch (7). These clutches are individually controllable, so that whichever one is permitted to be engaged determines the direction of table motion along a co-ordinate. When a table reaches a position in which a drilling or tapping operation is desired, the machine spindle is lowered to drill or tap the workpiece underneath it. The multiple spindle head is rotatable to bring the spindle holding the desired drill over the workpiece. The distance the spindle moves downward in the operation of drilling is a part of the machine and may be preset in advance.

In accordance with this invention, instructions for positioning a workpiece under a spindle are given with respect to the position of the table from a point of origin. This may be more readily understood if reference is made to FIGURE 1B. FIGURE 1B shows a two-co-ordinate graph. When the table of the drill press is at its extreme right hand and uppermost position, then the spindle of the drill press is said to be positioned over the origin point, designated as zero in FIGURE 1B. To move the table so that the spindle is positioned over the point designated as P1, the location of which is $x=1$ and $y=2$, instructions are issued to the machine tool to move the table, first, to the position at which $x=1$, and then, second, to the position at which $y=2$, while maintaining the $x=1$ position. Similarly, if it were desired to move the table to the point P2, at which $x=3$ and $y=3$, first, the instruction would be given to move the table to a position at which $x=3$, and, second, the instruction would be given to move the table along the $x=3$ value to the position at which $y=3$. The table location is indicated by positional transducers mounted on the respective x and y lead screws of a machine. The data derived from the positional transducers is compared with the data indicative of the position desired, and, when these two are equal, the machine table motion is stopped.

The blueprints of a drilling operation on a workpiece usually give the locations of the holes to be drilled, either with respect to two edges of the workpiece or with respect to some other reference axes. The workpiece may be fastened to the machine-tool table so that the reference axes on the blueprint for the operation on the workpiece may coincide with the reference axes of the worktable position, as represented on FIGURE 1B. In this case, the information for positioning the table is shown directly on the workpiece blueprint. Alternative to this, the workpiece may be fastened upon some other position on the table. For example, the position represented by the dotted lines in FIGURE 1B may be a workpiece fastening position. The location of the workpiece fastening position other than that coinciding with the x and y axes of the table merely requires that there be added to the information given on the blueprint the distance from the table axis origin to the origin of the data on the blueprint.

Assuming the information from FIGURE 1B, that the origin of the workpiece drilling data, when placed on the machine-tool table, will be at the points $x=\frac{1}{2}$, $y=1$, then it is merely necessary to add the ½ dimension to whatever x dimensions are on the blueprint, and the y dimension 1 to whatever y dimensions are on the blueprint, and the table will position itself so that accurate drilling of the holes will occur at the positions desired on the workpiece. This description is that of the well-known operation of linear translation of co-ordinates.

Reference is now made to FIGURE 2, which shows a block functional diagram of an embodiment of this invention. In the embodiment of the invention which was built, the storage medium for data which was selected was paper tape. In this paper tape, holes were punched indicative of the instructions to be performed by the machine. These commands, or data, were laid down in blocks. Each block would contain, in code, an indication of the desired one of the many spindles required for the operation to be performed, an indication as to whether the following co-ordinate number was for x or for y, the co-ordinate number or value itself, and thereafter an instruction to the spindle. This instruction would be, "drill, after reaching position; do not drill, after reaching position; or drill, after reaching position, and then stop." In accordance with the block diagram in FIGURE 2, the tape reader 10, which is a commercially purchasable reader for punched-hole tape, will read the information in one block at a time. An information distributor 12, which, in effect, comprises stepping switches, distributes the information in the block being read, respectively, to a table-position information-storage register 14, to a spindle-selection storage register 16, and to a spindle-command information-storage register 18. The tape reader stops reading as soon as a block of information has been completed.

The first operation to be performed is in response to the table-position information storage. Apparatus is provided which is identified by the rectangle 20, labeled x- or y-axis recognition. This apparatus identifies the table-position information as information for a position along the x- or y-axis. Upon such recognition, as will be more fully described subsequently herein, a switching operation is performed so that the position transducers on the respective x and y lead screws are connected to provide the necessary information for comparing the position of the table with the data which is in the table-position information storage 14. The data in the table-position information storage will comprise a binary-coded number whose value is given digit by digit in the range from the tens digit position down to thousandths-of-an-inch digit position. In accordance with this invention, values which are 0.020 of an inch or greater are considered coarse values, values between 0.020 and 0.010 are an overlap region, and values which are less than 0.010 of an inch are considered fine values. Thus, the table-position information storage 14 will have two outputs. One of these is applied to a coarse-error comparator 22 and will consist of the coarse values of the positional information. The other output of the table-position information storage is the fine-error information and is applied to a fine-error comparator 24. In the overlap region, outputs are applied to coarse- and fine-error comparators.

In accordance with this invention, two types of positional transducers are coupled to each lead screw. One of these is a digital positional transducer and provides an output consisting of a digital representation of the position of the table with respect to its origin. The other transducer is an analog transducer, and this provides an accurate indication of the position of the table between each one-tenth of an inch distance. Thus, it will be seen that the digital positional transducer provides coarse-error information, and the analog positional transducer provides fine-error information. The x- or y-axis recognition circuit 20 controls switches which will connect to the respective coarse- and fine-error comparators, whichever one of the transducers corresponds to the information recognized from what has been read from the tape. The switches 26A, 26B, 26C, 26D, and 26F in the position shown will apply y-axis positional information from the respective y-shaft position transducer 28, and the y-shaft phase-shifting resolver 30 to the respective coarse-error comparator and fine-error comparator. The respective x-shaft position transducer 31 and the x-shaft phase-shifting resolver 34 are not connected to the comparator at this time.

The output of the coarse-error comparator 22 is an error signal which occurs whenever there is a difference between the digital information which is in the table-position information storage register 14 and the digital information supplied from the y-shaft position transducer 28. This error signal is applied to a zero coarse-error senser 32, which, as long as a coarse error is sensed, in effect, maintains a first set of contacts 34 closed to bypass a high-value resistor 33 to directly connect the output of the coarse-error comparator to a mixer 36. The coarse-error senser also maintains a second set of contacts 35 open until no further coarse error is sensed, when these contacts are allowed to close. When the contacts 35 close, they increase the gain of an amplifier 37, to which they are connected.

The output of the fine-error comparator 24, consisting of a difference between the positional information provided by the y-shaft phase-shifting resolver 30 and that derived from the storage register 14 is applied directly to the mixer input. In addition to these two inputs, a third input is applied to the mixer. This consists of a voltage derived from either a y-tachometer generator 38, or when switched in instead, an x-tachometer generator 40. The voltage from the switched-in tachometer generator is applied to the mixer through the amplifier 37. The tachometer generators are respectively operatively coupled to the y and x lead screws, which drive the table of the machine tool. The one of these that is selected is determined by the operation of the x- or y-axis recognition circuit 20. Switch contacts 26C are actuated accordingly.

The voltage generated by the tachometer generators is applied to the mixer to oppose the signals obtained from the coarse-error comparator and the fine-error comparator. However, the amplitude of the signals is controlled such that the coarse-error signal overrides all other signals. Thus, as long as there is a coarse error, the mixer circuit 36 senses its polarity and, in response thereto, will cause to be operated either a y forward clutch 42 or a y reverse clutch 44. The switch contacts 26D and 26F are also positioned by the operation of the x- or y-axis recognition circuitry 20, so that the proper one of the clutches (x- or y-axis) will be energized by the output of the mixer. The x forward clutch bears reference numeral 46, and the x reverse clutch is designated by the reference numeral 48.

The machine-tool table is rapidly moved in the direction which renders the coarse-error zero. At this time, there is no coarse-error signal being applied to the mixer 36. Since, however, the table motion cannot be instantaneously arrested, the tachometer generator output voltage is controlling at this time and energizes the reverse clutch, whereby the table motion is attempted to be reversed. The table will skid through the zero coarse-error region which occurs over a range of ±0.020 inch, is then stopped, and its motion is then reversed, due to the coarse-error signal. The zero coarse-error senser 32 is designed not to operate rapidly, and thus the table will pass through the zero coarse-error region too fast the first time for the zero coarse-error senser to fully react.

When the table comes to a stop before being reversed, the tachometer generator output voltage will drop to zero. This is sensed by a tachometer zero-output detector 50, which is coupled to the amplifier 37. The tachometer zero-output detector 50 sets a first memory relay 51, which stores the fact of the first table stop. As the table reverses its motion, the zero coarse-error region is quickly reached. In this region, the zero coarse-error senser 32 can operate contacts 34 and 35 to prevent further input to the mixer from the coarse-error comparator, and, by closing contacts 35, can increase the gain of amplifier 37. Contacts 34 are switched to ground to short out the output of the coarse-error comparator and to insert the high-value resistor in circuit, to thereby cut off any coarse-error signals at this time. The amplitude of tachometer generator-output voltage being applied to the mixer 36 is increased. This voltage opposes that received from the fine-error comparator 24, with the result that the speed at which the machine-tool table is driven in response to the resultant of the two voltages is much less than it would have been without the increased tachometer generator voltage.

Since the table is now moving slower and slower under control of the difference of the two voltages, it can be stopped substantially instantaneously at the position at which the fine-error comparator output drops to zero. A second memory relay 53, which was set up by operation of the first memory relay 51, can now be operated by the tachometer zero-output detector 50. The operated secondary memory relay 53 then enables the spindle-command execution apparatus 52 to drill (or not, as instructed by the data in the spindle-command information storage), following the completion of which reset apparatus 55 can reset the system to receive the next block of data.

It should be noted that the selection of the proper spindle for drilling may be made during the time that the table is being positioned. Thus, the spindle-selection information-storage register 16 has the data therein compared with the data of the actual spindle position. This is a function of the spindle selection encoder 54, which is a set of contacts on the spindle turret which establishes a code representative of whichever spindle is in operating position. If there is a difference, then the spindle selection comparator 56 applies an output signal to a rectangle labeled "spindle-selection execution" 58. This represents circuitry whose function is to energize the spindle-selection apparatus to rotate the turret of the machine tool until the spindle selection encoder indicates that the desired spindle is in operating position. The reset circuit resets the information distributor stepping switches, as well as all the relay storage registers, and thereafter instructs the tape reader 10 to proceed to read the next block of information.

FIGURE 3 shows a typical layout of a block of data on tape for the purposes of this invention. The tape 70 may be either magnetic or punched paper tape. In the embodiment of the invention which was built, punched paper tape was used, consisting of eight-hole tape, with a ninth hole which served as the driving hole. The code employed for storing data would comprise four binary bits per data word, so that two data words would be stored on each row of holes. In the block on the tape, the data would be stored in accordance with the arrangement shown in FIGURE 3, so that in side-by-side fashion four holes would represent the spindle condition, and the remaining four holes would represent whether the motion resulting from the instructions was to be along the x-axis or along the y-axis, or neither. The next row of holes would provide four holes, representing the desired position of the table from the origin in tens of inches; the adjacent four holes would be the desired position of the table from the origin in units inches. The next row of eight holes would provide the tenths and hundredths of inches distance desired from the origin, and the fourth row of holes in the block would provide the thousandths of inches distance desired from the origin and data representative of the machine command or the fact that this block of information is to be disregarded, since an error has been made. From the above, it may be correctly surmised that the table distance desired from the origin is expressed on the tape in a binary-coded decimal form.

The spindle-condition information indicates which spindle is desired for drilling. The machine-command information indicates what operations the machine is to carry out when the table has reached its destination. In the table that follows, the binary code which was employed in the embodiment of the invention is set forth. The binary bit position in a binary digit may be designated, either by giving one of the letters $s, r, q, p$ or one of the numbers 1, 2, 3, 4 as a subscript.

*Tape (B) Code*

|   | 1 | 2 | 3 | 4 |
|---|---|---|---|---|
|   | $s$ | $r$ | $q$ | $p$ |
| 0 | 0 | 0 | 1 | 0 |
| 1 | 1 | 0 | 1 | 0 |
| 2 | 0 | 1 | 1 | 0 |
| 3 | 1 | 1 | 1 | 0 |
| 4 | 0 | 0 | 1 | 1 |
| 5 | 1 | 0 | 1 | 1 |
| 6 | 0 | 1 | 0 | 1 |
| 7 | 1 | 1 | 0 | 1 |
| 8 | 0 | 0 | 0 | 1 |
| 9 | 1 | 0 | 0 | 1 |

Position in $x$ = 1 0 0 0
Position in $y$ = 0 1 1 1
No position = 1 1 1 0
Error = 1 1 1 1

In the above code, when the binary number indicative of one is in the machine-command position of the block on the tape, this indicates that after positioning, a drilling operation should occur, the spindle should be returned to its home position, and the next block should be read from the tape. The binary number representative of two in the machine-command position in a block of data represents the information that after positioning the entire operation is to stop until the start button is pushed anew. The number three in the machine-command position represents the information that after positioning a drilling operation should occur, and the machine should then stop in place. The number zero in the machine-command position indicates that after positioning the machine should do nothing but wait for instructions from the next block of tape.

In view of the fact that the embodiment of the invention employs a large number of relays and relay contacts which must be shown in the drawings, a simplified legend will be employed to represent these relays and their contacts. This is shown in FIGURE 4. A rectangle 72 will represent a relay coil, and the identifying reference will be within that rectangle. This is indicated as an alpha in FIGURE 4. The normally open contacts will be represented as at 74 by two parallel lines with two lines at right angles to the respective parallel lines from their centers. If these contacts are the first contacts of a relay coil, they will be identified by the associated relay coil reference, with the number of the relay coil spaced therefrom by a dash. Thus, contacts 74 are the normally open first pair of contacts of the relay alpha and will be identified as $\alpha$–1. The second pair of contacts of the relay alpha are normally closed and, as shown at 76, have a slant line passing through the parallel lines. At 78 is a representation of single-pole, double-throw contacts, which, as is shown, comprise a normally open and normally closed pair of contacts which are joined. At 80 there is a representation of the contacts of a stepping switch. The home position of the switch has the normally closed contacts. The remainder are normally open.

Reference is now made to FIGURE 5, which is a drawing of the distributor stepping-switch contacts and the relay registers used for information storage of the digital data. As previously pointed out, the punched paper tape employed in the embodiment of the invention has eight data holes and one sprocket or driving hole. The tape reader, as is well known, has feeler pins, which, in the presence of the hole, will pass through the paper tape and thus actuate switches attached thereto to close their contacts. Thus, these switch contacts are closed or remain open, depending upon whether or not a hole is perforated in the tape. As seen in FIGURE 5, there are nine tape-reader switch contacts, respectively identified as TR–1 through TR–9. TR–9 represents switch contacts which are closed when any of the feeler pins is able to move by the presence of a hole. These contacts are in series with all the other tape reader contacts and connect them to ground when operated. This insures that the holes being read are proper ones. Contacts TR–1 through TR–4 are used to read out the data on the right of the tape, as shown in FIGURE 3. Contacts TR–5 through TR–8 examine the other side of the perforated tape.

For distributing the information which is read from the tape, there is employed a stepping switch having ten banks of contacts. Eight of these banks of contacts are shown in FIGURE 5. These are respectively designated as SS–3 through SS–10. The remaining two banks of contacts are shown in a subsequent figure of the drawing. In FIGURE 5, only the third deck, designated as SS–3, is shown in detail. The remaining decks are represented as rectangles with lead lines emanating therefrom to the relays to which they are connected. The numerals adjacent these lead lines represent the contact numbers in that deck of the stepping switch to which these lead lines are connected. The third deck of the stepping switch has all its contacts connected in series with the tape reader contact TR–5; the fourth deck of the stepping switch is connected in series with contact TR–6; and the respective fifth, sixth, seventh, eighth, ninth, and tenth decks are connected to the tape reader contacts TR–7, TR–8, TR–1, TR–2, TR–3, and TR–4.

In order to facilitate association of storage relays with their contacts as well as with the data being stored, the following nomenclature is being employed. The spindle selection commands are stored in four relays, respectively designated as S–1 through S–4. The $x$- or $y$-axis information is stored in four relays, respectively designated as $XY_1$ thorugh $XY_4$. Tens of inches information is stored in a relay $10_1$. Units of inches information is stored in relays $1_1$ through $1_4$. Tenths of inches information is stored in relays $0.1_1$ through $0.1_4$. Hundredths of inches data is stored in relays $0.01_1$ through $0.01_4$. Thousandths of inches information is stored in relays $0.001_1$ through $0.001_4$. Machine commands are stored in relays $K_1$ through $K_4$. The subscript numbers refer to the binary bit positions of a binary digit and may be identified from the tape or "B" code table given previously.

Considering the stepping switch deck SS–3, it will be seen that, on that deck, contacts numbered 0, 4, and 8 are connected together and to a relay designated as $S_1$. The fourth, fifth, and sixth decks also have their contacts at the 0, 4, and 8 positions, connected in parallel, and respectively to relays $S_2$, $S_3$, and $S_4$. These relays store, by their operated and nonoperated conditions, the spindle-selection command, which is read from the paper tape by contacts TR–5 through TR–8 on the first line of information in the particular block of data. Simultaneously therewith, tape reader contacts TR–1 through TR–4 will read the $x$- or $y$-axis command into the respective relays $XY_1$ through $XY_4$. These relays are respectively connected to the 0, 4, and 8 contacts on decks 7, 8, 9, and 10 of the stepping switch. It should be noted that relays $S_1$ through $S_4$, when operated, are latched in operating condition by means of contacts $S_1$–4, $S_2$–4, $S_3$–2, and $S_4$–2. Similarly, relays $XY_1$ through $XY_4$, when operated, are latched by contacts $XY_1$ through $XY_4$. The other side of all these relay coils are connected to a reset relay, which will be shown and described subsequently.

The second row of holes in the punched tape represents the units and tens of inches information. The largest commanded motion in the embodiment of the invention being considered in 19.999 inches. Thus, it is only necessary to store the fact that a one or zero is present in the s-bit position to indicate the presence or not of ten inches. Accordingly, the tens of inches command is stored in a single relay, designated here as $10_1$. This relay is connected to the contacts of the third deck of the stepping switch, which bears the numbers 1, 5, and 9. Latching contacts $10_1$–1 are closed to keep relay $10_1$ closed until the register is reset.

The units motion command is stored in relays $1_1$ through $1_4$. These relays also are connected to the contacts identified by numerals 1, 5, and 9, which are on decks 7, 8, 9, and 10 of the stepping switch. These relays $1_1$ through $1_4$ may be respectively latched closed through respectively associated contacts $1_1$–1, $1_2$–1, $1_3$–2, and $1_4$–2.

The tenths of inches is stored in relays respectively $0.1_1$ through $0.1_4$. These are connected to contacts 2, 6, and 10 on the respective SS–3, SS–4, SS–5, and SS–6 decks of the stepping switch. These relays, when operated, are latched closed by the respective contacts $0.1_1$–1, $0.1_2$–1, $0.1_3$–1, and $0.1_4$–4

The hundredth of inches data is stored in relays $0.01_1$ through $0.01_4$. These relays are connected to similarly identified contacts in decks SS–7 through SS–10 of the stepping switch. Relay $0.01_1$ is connected to contacts 2, 6, and 10 of deck SS–7; relay $0.01_2$ is connected to contacts 2, 6, and 10 of deck SS–8; relay $0.01_3$ is connected to contacts 2, 6, and 10 of deck SS–9; and relay $0.01_4$ is connected to contacts 2, 6, and 10 of deck SS–10. These relays are latched over respectively associated contacts $0.01_1$–2, $0.01_2$–2, $0.01_3$–1, and $0.01_4$–1.

The last row in a block of information indicates the thousandths of an inch data on one side and the machine commands, or an error, on the other side. Relays $0.001_1$ through $0.001_4$ store the thousandths of an inch information; relays $K_1$ through $K_4$ store the machine-command information. All these relays are connected to the similarly numbered contacts of the respective decks SS–3 through SS–10 of the stepping switch. These contacts bear the numbers 3, 7, and 11. None of these relays has a special set of contacts for latching. The reason is that when the tape reader reaches the fourth row of holes in a block, it stops. Therefore, contacts TR–1 through TR–8 will remain open or closed in the condition dictated by the holes perforated in the tape in the fourth row. Accordingly, relays $0.001_1$ through $0.001_4$ and $K_1$ through $K_4$ are maintained latched by the reading pin contacts.

From the above description, it should be seen how, as the tape is moved successively under the tape-reading pins and the stepping switch is operated a step at a time in synchronism therewith, a block of data consisting of four rows or eight data words, two per line, is successively distributed into eight sets of relays. When the fourth row of holes is reached, the tape reader stops and the relays will be latched to represent the data which has just been read.

The relays which are maintained latched through the pins in the tape reader are connected directly to the operating potential supply. The other relays shown in FIGURE 5 are all connected to the operating potential supply through the contacts 122–1 of a reset relay which is shown in FIGURE 6B.

Figure 6A:
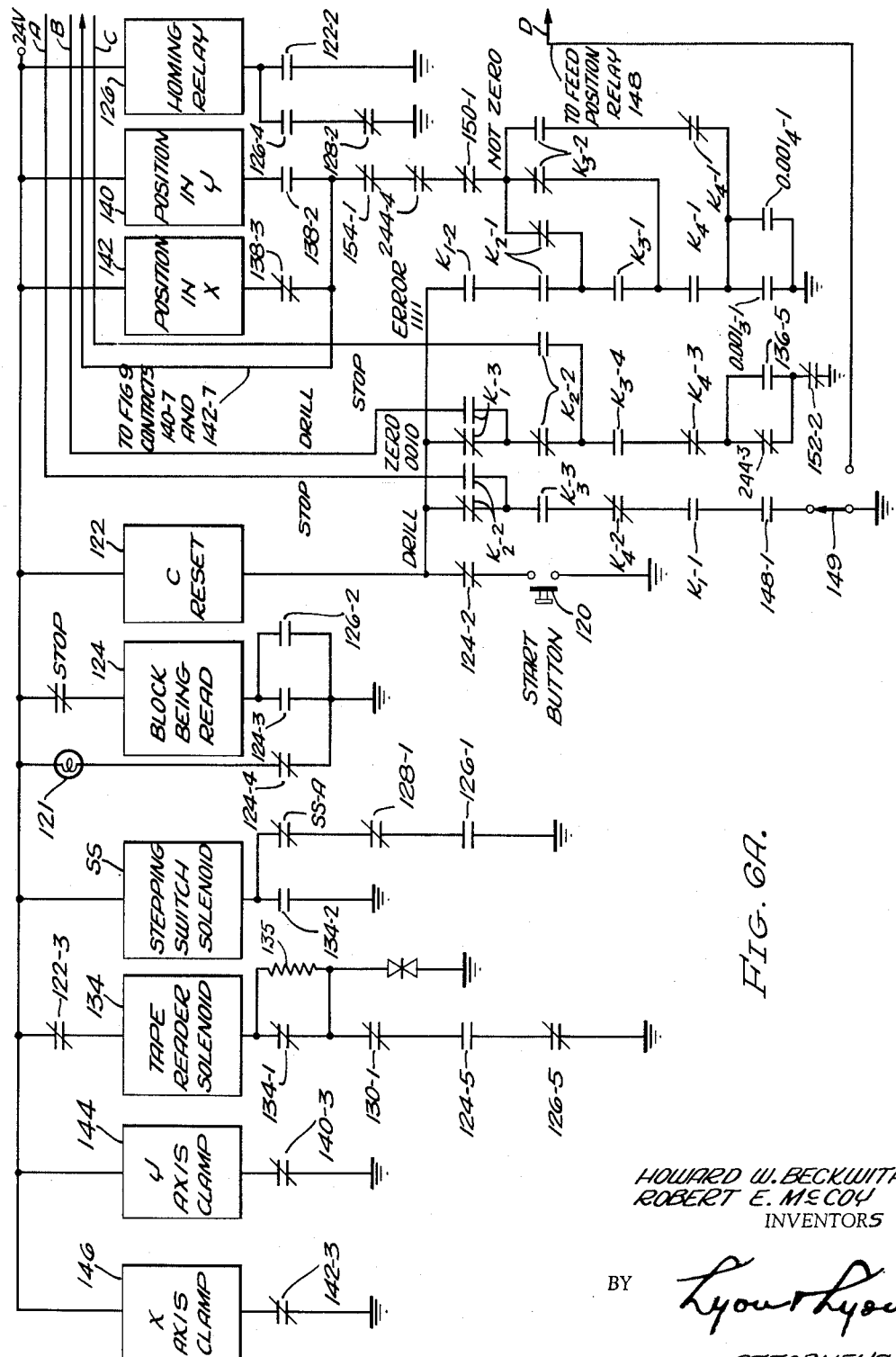

FIGURES 6A and 6B comprise a schematic diagram of the relay arrangement used for sequencing the embodiment of the invention. In order to start the operation of the invention to control an automatic drill press in accordance with information recorded on punched paper tape, a start button 120 (FIGURE 6A) is pressed. This excites a reset relay 122 through the normally closed contacts 124–2 of a block read relay 124. The block relay is energized in a manner to be described each time a block of data is being read. Upon operation of the reset relay 122, a homing relay 126 is operated in response to closing the contacts 122–2 of the reset relay. The function of sensing whether or not the stepping switches are on a home position is performed by a home-sensing relay 128 (FIGURE 6B). This relay is operated whenever the stepping switch is on one of the three home positions. The home position corresponds to contacts 0, 4, and 8 of each stepping switch deck. The reason these are the home positions is because since only four rows of holes are read at a time, the selector switches are connected to distribute the data being read into the proper registers commencing each time with the 0, 4, and 8 positions of the stepping switch-contacts on each deck. Thus, the home senser is connected to the deck SS–2, or second deck of the stepping switches, to be operated whenever contacts 0, 4, or 8 are made by operation of the stepping switch.

The stepping-switch solenoid SS (FIGURE 6A) is operated over a path including self-interrupting contacts SS–A, which are normally closed contacts, normally closed contacts 128–1 of the home-sensing relay, and normally open contacts 126–1 of the homing relay. The stepping switch is of the type wherein when the solenoid is operated this enables the self-stepping contact SS–A to be opened, at which time the solenoid is rendered inoperative and a cocked spring mechanism (not shown) is released, which advances the position of the movable arms on each of the decks of a stepping switch to advance to the next contact position. The stepping switch will continue to advance until contacts 128–1 are opened. This occurs when the home-sensing relay 128 is operated by reason of the stepping switch having reached either the 0, 4, or 8 homing position. It should be noted that the homing relay 126, when operated, causes block relay 124 to be operated through contact 126–2 of the now-operated homing relay 126. The block relay 124 then latches up over its contact 124–3 and extinguishes a start-ready light 121, which was illuminated at the beginning of the operation, over its normally closed contacts 124–4.

The operation of the block relay 124 renders the reset relay 122 inoperative, since the contacts 124–2 of the block relay are now opened. If the home-sensing relay 128 has not yet sensed a home position, the homing relay 126 will remain operated even through contacts 122–2 of the reset relay are now open. The latching path of the homing relay includes its own contacts 126–4 and the normally closed contacts 128–2 of the home-sensing relay. When the home position is reached, then the homing relay 126 is no longer operated and the stepping switch solenoid SS can no longer operate through the path including contacts 126–1 of the homing relay, which are now open.

Since the stepping switch has reached a home position, the first two data words are read into the storage registers. It is then necessary to advance the tape-reading apparatus to the next row of holes. In order to accomplish this, a validity relay 130 senses whether or not a valid transfer of data into the registers has occurred. Such sensing is performed by employing the first deck of the stepping switch SS–1 to transfer the operating path of the validity relay to the various registers in synchronism with the distribution of information by the stepping switches into these registers. Extra sets of contacts are provided on each of the relays in the register, which obviously are operated or not in accordance with the relay with which it is associated. The binary code selected for recording on the tape is one wherein in certain locations a binary one and/or a binary zero must occur. If at either of these locations this is not sensed, then it is known that an erroneous transfer of information has occurred or that the information from which the transfer occurred itself is erroneous. Should this happen, the tape reader is not advanced any further, and no further operation of the system will occur until the situation has been investigated.

In accordance with the previous description, the first two words which are entered into the registers from the tape comprise the particular spindle desired and the information as to whether the table will move along the x-axis or the y-axis or will not move. Deck SS–1 of the stepping switch connects the validity relay when the stepping switch is in its 0, 4, or 8 contact position to two parallel branch circuits, one of which is set up to connect to ground when an X is entered, and the other when a Y is entered. The X branch constains in series normally open contacts $XY_1-1$, normally closed contacts $XY_2-1$, normally closed contacts $XY_3-1$, normally closed contacts $XY_4-1$, and normally open contacts $S_3-3$. The second branch contains the following contacts: normally closed contacts $XY_1-3$, normally open contacts $XY_2-2$, normally open contacts $XY_3-2$, normally open contacts $XY_4-1$, and normally open contacts $S_4-4$.

Since, as previously indicated, the X command requires the presence of a one at the Number 1 bit position, with the remainder comprising zeros, and the Y command, which is the reverse, comprises a zero at the Number 1 bit position, with the remainder ones, when an X is present, contact relay $XY_1$ is operated, closing contacts $XY_1-1$. The remaining relays $XY_2$ through $XY_4$ are unoperated and the associated normally closed contacts remain closed. Should a Y be present, relay $XY_1$ is not operated, and the remaining relays $XY_2$ through $XY_4$ are operated; thus a path to ground is provided over the Y branch.

The spindle selection code for a six-spindle machine will comprise any one of the first six binary numbers in the code. It will be seen that this requires a one in the third position of the code or a one in the fourth position of the code. Accordingly, should relay $S_3$ or relay $S_4$ be operated, then a path is closed in series with the corresponding X or Y contacts to cause the validity relay 130 to be operated.

Diode 132 connected across the validity-relay coil is a double-anode selenium diode used to protect the contacts which break the validity-relay coil current against high voltage surges that might otherwise damage these contacts. The validity relay operation determines the sequencing of the tap-reading apparatus; namely, the validity relay will operate when a valid entry is made to the register, and by its operation enables the tape to be advanced.

Before leaving the description of the validity relay, it should be noted that positions 1, 5, and 9 of deck SS–1 connect the validity relay to normally open contacts $1_4-1$ and $1_3-1$. These are arranged to provide a parallel circuit to ground. Either one of the contacts $1_4-1$ or $1_3-1$ must be closed when an entry is made into the units register, or an invalid entry has been made. The tens relay is not considered in the validity check.

Positions 2 and 10 of deck SS–1 of the stepping switch connect the validity relay to arrangements of contacts of the tenths and hundredths of an inch register. For valid entries into these registers, a path to ground is provided through normally open contacts $0.01_3-1$ and $0.1_3-1$ or $0.1_4-1$, or instead through normally open contacts $0.01_4-1$ and $0.1_4-1$ or $0.1_3-1$. It will be appreciated again that for this examination of the validity of an entry one of the four possible paths to ground is provided only when the binary numbers entered in the 0.01 and 0.1 registers are valid ones.

Attention is now directed to the tape-reader solenoid 134 (FIGURE 6A). This must be operated in order to activate the hole feeler pins in the tape reader, but must be de-energized to advance the tape. This tape-reader solenoid is connected to the source of operating potential through normally closed contacts 122–3 of the relay 122, which is the reset relay. The tape-reader solenoid thus cannot be operated to allow tape reading so long as the reset relay is operated. An operating path to ground is provided for the tape-reader solenoid through its own normally closed contacts 134–1, through the normally closed contacts of the validity relay 130–1, through the normally open contacts of the block relay 124–5, and through the normally closed contacts 126–5 of the homing relay. Resistor 135 serves to maintain operating current to the tape-reader solenoid when contacts 134–1 are open. This operating current is reduced in value to prevent solenoid overheating. Thus, the condition for advancing the tape reader is that its solenoid be energized and de-energized in sequence, which requires that the block relay 124 be energized, the homing relay 126 be de-energized, and the validity relay be de-energized. Since, once operated, the block relay remains operated and the homing relay thereafter remains unoperated, advancement of the tape reader and operation of its solenoid is dependent upon operation of the validity relay. Each time the validity relay is operated, normally closed contacts 130–1 are opened, thus de-energizing the tape-reader solenoid and allowing the tape to be advanced. The set of normally open contacts 134–2 provides an alternative path to ground for operation of the stepping switch SS to the one previously described. Thus, the stepping switch will advance with the closing and opening of the contacts 134–2, which occurs with the operation and nonoperation of the tape-reader solenoid 134. This assures that the stepping switch and the tape advance from a row of holes to a row of holes is maintained in synchronism. The validity relay is rendered inoperative each time the stepping switch advances, since thereby deck SS–1 breaks and then makes contact with a succeeding register, the validity of the contents of which are then tested, and then the validity relay closes again to start the tape-reader advance cycle again.

Some of the contacts at the validity-sensing relay are employed for sensing whether or not a no-position code has appeared. It will be recalled that this no-position code corresponds to 1110, or that relays $XY_1$, $XY_2$, and $XY_3$ be operated and relay $XY_4$ remains unoperated. A serial path to ground is provided for a relay 136 (no-position relay) through normally open contacts $XY_1-4$, $XY_2-4$, $XY_3-4$, and normally closed contacts $XY_4-4$. The no-position relay prevents the table from being moved in response to any commands received from the block of data which has just been read.

If a valid Y code is sensed and a valid spindle code is sensed, then an operating path is provided for an "X–Y" relay 138 through normally closed contacts $XY_1-2$. Relay 138 latches up over contacts 138–1. Relay 138 will always be operated when a valid Y is sensed, and will remain unoperated when a valid X is sensed. It should be noted that neither relay 138 nor 136 can be operated, unless the reset relay 122 is unoperated. Operating potential is applied to these two relays through the normally closed reset relay contacts 122–1.

In response to operation of the Y relay 138, a position in Y relay 140 is operated over normally open contacts 138–2 being closed, as well as other conditions which will be discussed subsequently. If the Y relay 138 is not operated, then position-in-X relay 142 can be operated over the normally closed contacts 138–3, as well as conditions occurring which will be described subsequently herein. When relay 140 is operated, then a solenoid-operated brake, designated as the y-axis clamp 144, is released by opening of the normally closed contacts 140–3. If the relay 142 is operated, then its normally closed contacts 142–3 are opened; thereby, the solenoid 146, which is the x-axis clamp solenoid, is released, whereby the brakes preventing the table from operating along the x-axis are released. It should be appreciated that in the absence of an X or Y instruction, the X clamp and Y clamp solenoids 146 and 144, respectively, remain operated, and the table is held stationary.

In recapitulation of what has been described thus far, when a start button 120 is energized, a reset relay 122 functions to enable only relay 126 to initiate homing of the stepping switch SS and to clear all the relay registers. Homing is sensed by a homing-senser relay 128, whereupon the data contained in the first row of holes in the perforated tape is read into the first register. Whether or not this data is valid is sensed by an arrangement of contacts within the register receiving the first two data words. If this data is valid, then a validity relay 130 is enabled to be momentarily operated, whereby a tape-reader solenoid can be advanced to the next row of holes for entering them into the relay register. Another relay senses whether the first two words of data contain X or Y instruction, or no-position instruction, and the machine is thereafter set up to operate in response to the subsequent information containing the position desired along either the X or the Y axis of the machine. The validity relay 130 functions in conjunction with the first deck of the stepping switch, so that the tape-reader solenoid is enabled to advance until it reaches the fourth row of holes containing data. At this point, the tape-reader solenoid can no longer advance, since the validity relay remains unoperated. A cycle of operation and non-operation of the validity relay is required in order to advance the tape-reader solenoid. The stepping switch, which after its initial operation operates in response to the tape-reader solenoid operation, also remains in the position for entry of data into the fourth register. It will be shown that upon the execution of the command which has been stored into the relay registers, the reset relay is energized, whereby the cycle of operations just described may be repeated.

Attention is now directed to the arrangement of contacts which are connected to the reset relay 122 in parallel with the start button 120. Essentially, there are three parallel paths made to ground, whereby the reset relay may be operated. The first one of these senses the completion of a drilling operation, the second senses that the registers should be cleared and a new block read, and the third path recognizes the error symbol. Considering the first path, it includes the normally closed ones of single-pole, double-throw contacts $K_2$-2 of relay $K_2$, in which machine commands are stored. These contacts are in series with normally open contacts $K_3$-2, normally closed contacts $K_4$-2, normally open contacts $K_1$-1, and the normally open contacts 148-1 of a feed position relay 148. The feed position relay (FIGURE 6B) is controlled by a switch 149 on the automatic drill press, which is energized whenever the spindle has fed down into a position to drill. A microswitch 149 is mounted on the spindle feed, and, whenever the spindle feed is in its up, or nonoperative, position, it connects the contacts 148-1 to ground. Whenever the spindle feed is at down, or in its drilling position, these microswitch contacts connect ground to the feed position relay 148, whereby it is enabled to operate and close its contacts 148-3, whereby it is latched in an operative condition and is only released when the reset relay 122 operates the contacts 122-1 to break the supply of power to this relay.

From the consideration of the code table which has been previously given, it will be seen that there are two binary numbers which contain drill instructions—one corresponding to the binary number 1010, and the other corresponding to the binary number 1110. When the first drill instruction is read, then normally open contacts $K_3$-3 and $K_1$-1 are closed. The microswitch 149 is operated to the down-limit position on the spindle feed when the spindle has reached its down position. At this time, the feed position relay is operated and remains operated, while the spindle is retracted to its up position. At this time, the microswitch 149 can complete the path to ground for enabling the reset relay 122 to operate, whereby the registers are reset, as well as the other equipment dependent thereupon, and the tape reader and stepping switch are properly energized to initiate a new cycle of operation.

Should the drill-stop instruction, which is coded as 1110, have been read, then the contacts $K_3$-3, $K_4$-2, $K_1$-1, 148-1, and microswitch 149 operate as previously described. However, the normally open contacts of single-pole, double-throw contacts of relay $K_2$ are now operated to make a path to ground for a stop relay 150 (FIGURE 6B). Therefore, when the drilling operation which has been commanded is completed, the spindle returns to its up position, whereupon instead of the reset relay being operated, the stop relay 150 is operated and latched in an operated position by its contacts 150-4. The machine will not operate any further until the start button 120 is depressed, whereby the stop relay 150 is de-energized, and the system is reset.

The writing of a zero in the machine-command position in the fourth row of holes in a block informs the machine that it should not drill, but that tape reading should be continued. Another indication that tape reading should continue is the storing of the error code, represented by 1111, in the machine-command position. This code may be punched on the tape by the operator who prepared it, if he realizes that he has made a mistake. He then (manually) back spaces the tape one line and then punches a button on the keyboard of the tap punch which enters all holes (1111) in the tape, thus suppressing whatever code may have been previously punched.

Consider, first, the appearance of a zero, 0010, which when entered into the machine-command storage-register relays, will result in the energization of relay $K_3$. Thereby, the contacts $K_3$-4 are closed. Thereby, a path for causing operation of the reset relay is provided through the normally open contacts 258-1 of an end-of-motion relay 258 (to be described in connection with FIGURE 9) or the normally open contacts 136-5 of no-position relay 136, and through the normally closed contacts of a spindle-position-sensing relay 152-2. This spindle-position-sensing relay is only released when the spindle is in the position which corresponds to the one command. If the spindle head is still rotating to get to the proper spindle which has been commanded, then the reset relay will not be permitted to operate until after this spindle selection has terminated.

A stop command in the machine-command position on the tape is indicated by the code number 0110. A path to ground to cause the stop relay 150 to be energized may be traced through the normally closed contacts of the double-pole, single-throw contacts $K_1$-4 through the now-closed contacts $K_2$-3, through the now-closed contacts $K_3$-4, through normally closed contacts $K_4$-3, and through the tachometer-generator zero-detector relay contacts and contacts 244-3, 152-2 of the spindle-position-sensing relay when it is released.

The code for a drill command is 1010. This requires relays $K_1$ and $K_3$ to be operated. A drill-command relay 154 is operated when the drill command is recognized. This relay, when operated, instructs the machine to commence drilling. A path for operating this relay may be traced over normally open contacts $K_1$-3, which are now closed, since the relay $K_1$ is operated. Contacts $K_3$-4 are also now closed, since relay $K_3$ is operated. Contacts $K_4$-3, which are normally closed, remain closed, since relay $K_4$ is not operated; the contact of the tachometer-generator zero-voltage relay remains closed; and contacts 152-2 are closed when the spindle selection has been completed. Drill relay 154 latches in an operated position over its contacts 154-2.

The sensing of a 1111 error requires the energization of all relays $K_1$ through $K_4$. This results in the closing of the associated contacts $K_1$-2, $K_2$-1 (normally open side), $K_3$-1, and $K_4$-1. In addition to all of these contacts being closed, it is also required that either relay $0.001_3$ or $0.001_4$ be operated. Thus, either contact $0.001_3$-1 or $0.001_4$-1 will be closed, whereby a path to ground is provided to operate the reset relay 122. The reason for including operation of the $0.001_3$ and $0.001_4$ relays, in addition to the sensing of the error code, is that in view of the code selected, a one will be stored in either the third or the fourth binary bit position. For purposes of testing, it may be desirable to store the four ones in the machine-command position without causing the reset relay to operate.

Thus, the additional requirement that some information has been stored in the thousandths of an inch register.

It was previously described that a reading of an X or a Y from the tape caused relay 138 to be operated or not operated, and, as a result, either relay 140 or 142 had a path prepared through either contacts 138–2 or 138–3 in series with other contacts. The following description is directed to the remainder of the path for operating one or the other of these two relays. As may be seen in the drawing, contacts 138–2 and 138–3 are connected in series with the normally closed contact of relay 154, which is the drill relay. As previously described, during a drilling operation this relay is operated. Therefore, since contacts 154–1 are normally closed contacts, operation of relays 140 or 142 is withheld until a drilling operation is terminated. In series with contacts 154–1 are the normally closed contacts 244–4 speed relay 244. This relay senses table motion. In series with these contacts are the normally closed contacts 150–1 of the stop relay 150. These normally closed contacts 150–1 will be opened only when the stop relay is excited. Thereafter, three possible paths to ground are provided. One of these includes normally closed contacts $K_2$–1, normally open contacts $K_3$–1 of relay $K_3$, normally open contacts $K_4$–1 of relay $K_4$, and either contacts $0.001_3$–1, which are normally open, or contacts $0.001_4$–1, which are also normally open. A second of these paths includes the normally closed contacts of a pair of contacts $K_3$–2 and the normally open relay contacts $K_4$–1, and either contacts $0.001_3$–1 or contacts $0.001_4$–1. The last of these parallel paths includes the normally open contacts of contact pair $K_3$–2, the normally closed contacts of contact pair $K_4$–1, and the normally open contacts $0.001_3$–1 or $0.001_4$–1. The purpose of these three parallel paths is to sense the presence of any instruction in the machine command portion of the block of data other than that represented by zero.

To recapitulate the description of the contact arrangements, a first path for providing the operation of the reset relay 122 is effectuated upon the recognition that a drill command was executed. The reset relay is then enabled to clear the register and the machine can go on to respond to the next block of data that is read. The second path for operating the reset relay is provided when the presence of a zero (no drilling) command is detected. The reset relay is then permitted to operate only after execution of the spindle command (if any). A third path is provided for the reset relay to enable its operation if an error code, consisting of four ones, is read from the machine-command position. Using the contacts of the error-code-sensing arrangement in addition to other contacts on the machine-command register and contacts on the drill and stop and speed-sensing relays, a recognition is made of the fact that no error has been committed in the readout from the machine-command section, that no drilling operation is being carried on, and that no stop command has occurred. A path is thus provided for energizing either of two relays which result in releasing the X or Y brake, to allow motion of the machine-tool table along the x- or y-axis. It should be noted that since the drilling operation is one that occurs after the table has reached a desired location, by sensing the completion of a drilling operation it is known that the command in a block has been carried out and new data is required. If no further data is read, then the machine terminates the operation.

It was indicated that the relay 152 (FIGURE 6B) was de-energized when the turret had attained the position commanded. Any one of nine turret positions may be selected by storing selection commands consisting of the code numbers from one through nine. Relays $S_1$ through $S_4$ will then assume a representative operated and non-operated condition. In series with relay 152, there is first seen the parallel-connected normally open contacts $S_1$–2, $S_2$–2, $S_4$–3. In the code chosen, a reading out of any one of the number from one through nine will cause at least one of these contacts to be closed by reason of the operation of the associated relays $S_1$, $S_2$, or $S_4$. In series with the three parallel-connected contacts just enumerated are four double-throw arrangements of the contacts $S_1$–3, $S_2$–3, $S_3$–1, and $S_4$–1, which are also associated with the relays $S_1$ through $S_4$. The position assumed by these contacts is also determined by the command code which has been read. Four switches 156A through 156D are operated by cam 155 on the rotatable turret and assume positions indicative of the spindle which is in operating position. Until these switches assume a complementary position to that of the double-throw contacts, a path to ground is completed for relay 152. A set of contacts 152–1, which are normally open, serve the function of instructing the turret-drive motor to rotate until the turret relay 152 is released. To prevent turret rotation while drilling is in progress, the turret-drive motor is energized only when the normally closed "drill" relay contacts 154–1 are open, when the turret relay contacts 152–1 are closed, and when the feed position relay 148 is not operated, whereby its contacts 148–2, which are normally closed, remain closed. The feed-position relay is operated through switch 150 as soon as the spindle starts to feed downward and latches itself through contacts 148–3. It will be noted that the feed-position relay 148 is rendered inoperative when the reset relay 122 is rendered operative.

Figure 7A:
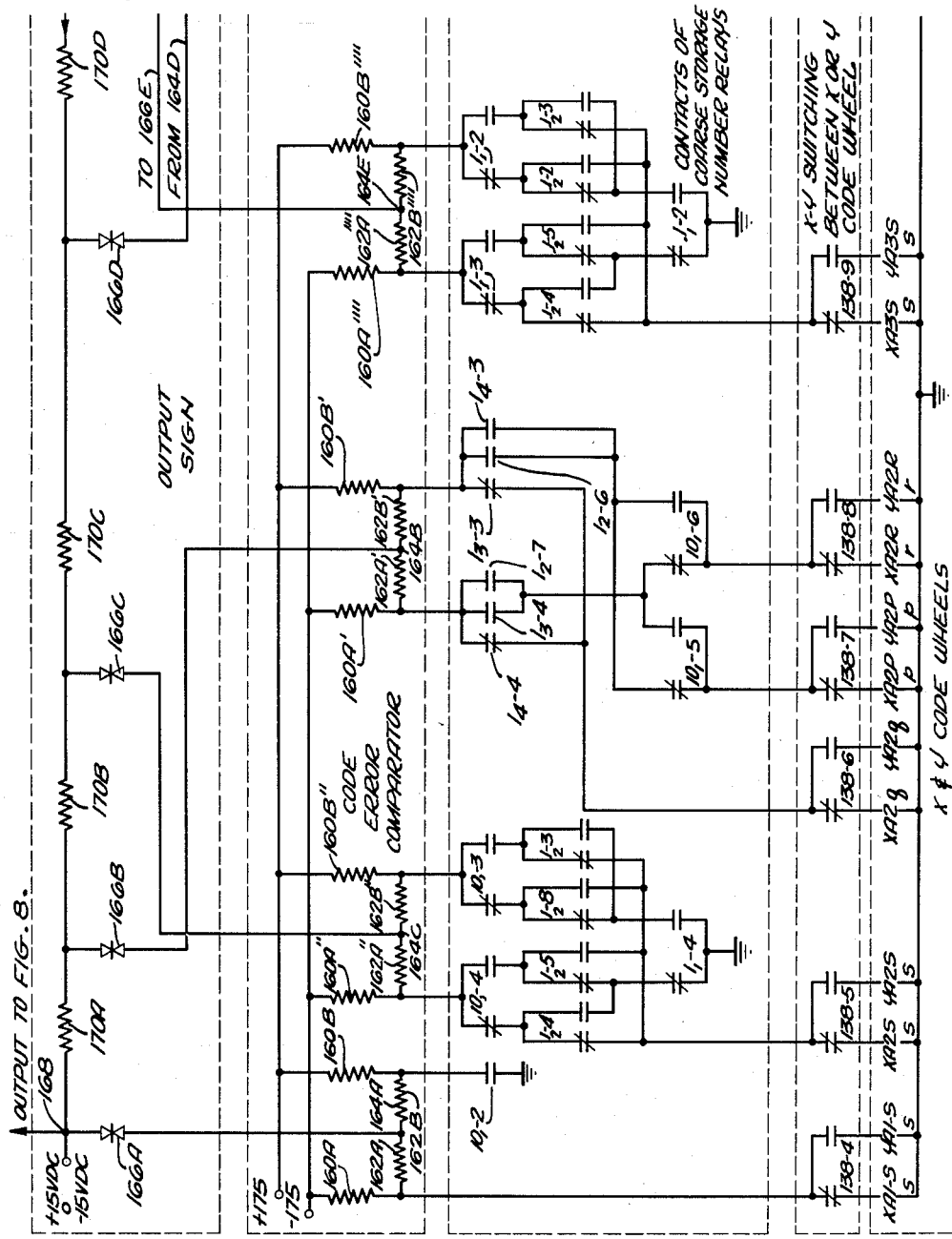

Attention is now directed to FIGURES 7A and 7B, which comprise a schematic diagram of the coarse-error comparator employed in this invention. The coarse-error signal is generated by comparing the digital information in the coarse-error registers with the digital information derived from a digital position encoder mounted on each lead screw of the machine tool. Such digital positioning coders are well-known in the art and are commercially purchasable. By way of illustration and not to be construed as a limitation, in an embodiment of the invention which was built an X and a Y code wheel were respectively mounted to be driven from the respective X and Y lead screws. Each wheel has a circular pattern of printed-circuit conductors arranged to be sensed by several brushes, whereby the position of the lead screw to which the wheel is coupled is indicated. The code wheel employed in the embodiment of the invention which was constructed, which is also known as a coded commutator, was purchased from the G. M. Giannini & Co., Inc., of Pasadena, California. The complete description and drawings of the wheel are found in the manufacturer's publication, "Instruction Manual for Installation, Operation, and Maintenance of the 14310–14311 Series Digital Data Systems."

The code wheel is divided into 1,000 angular positions, each angular position being defined by a unique combination of contact closures. The contacts are formed by 13 brushes riding on the photo-etched pattern of the code wheel. Each group of four brushes generates a binary code defining one decimal digit. The thirteenth brush is the common contact. The code selected is called binary-coded cyclic decimal, wherein the adjacent binary numbers differ in only one contact closure. Thus, only one brush passes from a conducting to a nonconducting segment for each different angular position. This makes it possible to avoid ambiguities and errors that can occur if a plurality of simultaneous contact changes are required.

In view of the fact that two different codes are employed, one on the commutator and the other in the storage register, it is necessary to perform a code conversion as well as a comparison. It will be recalled that the x-axis lead screw and the y-axis lead screw each have a separate position transducer. Motion occurs along one axis at a time. Accordingly, a comparison need only be made between the position data output of the commutator on the moving lead screw and the information as to the desired position which is in the register. Switching between the X and Y commutator is a function performed by the relay 138.

The code which is employed in the code wheel is given below. For convenience and comparison, the tape code previously shown is repeated adjacent the code-wheel code.

| Code Wheel (A) Code |   |   |   | Decimal Meaning |   | Tape (B) Code |   |   |   |   |
|---|---|---|---|---|---|---|---|---|---|---|
|   |   |   |   | If next digit to left |   | Decimal Meaning | 1 | 2 | 3 | 4 |
| s | r | q | p | is even | is odd | | s | r | q | p |
| 0 | 0 | 0 | 1 | 0 | 9 | 0 | 0 | 1 | 0 | 0 |
| 1 | 0 | 0 | 1 | 1 | 8 | 1 | 1 | 1 | 0 | 0 |
| 1 | 0 | 1 | 1 | 2 | 7 | 2 | 0 | 1 | 1 | 0 |
| 0 | 0 | 1 | 1 | 3 | 6 | 3 | 1 | 1 | 1 | 0 |
| 0 | 0 | 1 | 0 | 4 | 5 | 4 | 0 | 1 | 0 | 1 |
| 0 | 1 | 1 | 0 | 5 | 4 | 5 | 1 | 0 | 1 | 1 |
| 1 | 1 | 1 | 0 | 6 | 3 | 6 | 0 | 1 | 0 | 1 |
| 1 | 1 | 0 | 0 | 7 | 2 | 7 | 1 | 0 | 0 | 1 |
| 0 | 1 | 0 | 0 | 8 | 1 | 8 | 0 | 0 | 0 | 1 |
| 1 | 1 | 0 | 0 | 9 | 0 | 9 | 1 | 0 | 0 | 1 |

In the cyclic decimal code one proceeds from zero to ten, then from 19 to 11, then from 20 to 30, then from 39 to 31, then from 40 to 49, etc. Thus, 19 in cyclic decimal code has a value of 11 in the ordinary decimal code, 17=13, 22=22, etc. When given a cyclic decimal number, to determine its value in the decimal code, the digit to the left of the one being considered is looked at. If it is odd, then the digit considered has a ten's complement value in decimal code. If it is even, then the value is as shown. Now considering the cyclic binary decimal code, each decimal digit is represented by four binary bits, as shown in the Code Wheel or A Code. The two columns adjacent the A Code show the decimal meaning of a digit comprised of four binary bits. Thus by way of illustration, if eight binary bits were provided, i.e., 0010 1010, which represent in cyclic binary-coded decimal 45, to see the decimal value of the 5 digit, the 4 digit is inspected. Since it is even, the decimal value of the 5 digit is 5.

Each code wheel mounted on the lead screw has 13 tracks with a brush mounted on each track. The tracks are arranged concentrically and are contiguous to one another. The arrangement of the track is such that when a brush is on any track, it is connected through the other tracks to the central ring of tracks and from there to the central common brush. In the drawing, two sets of 12 leads are shown, extending from a common ground. The common ground is connected to the thirteenth, or common, brush. The leads shown in the drawing respectively represent leads connected from the brushes over the Y disc and over the X disc. The set of 12 leads from the X disc are respectively designated as XA1s, XA2s, XA2q, XA2p, XA2r, XA3s, XA3q, XA3p, XA3r, XA4q, XA4p, XA4r. The leads from the Y disc have similarly applied thereto the same reference numerals except that each one of these is prefaced by a "Y." Since the code on the disc is designated as the "A" code, and the code in the punched paper tape is designated as the "B" code, the letter "A" following either the X or the Y refers to the fact that the A code is under consideration. As is seen in the code tables, the binary bit positions are represented by the letters $s$, $p$, $q$, $r$, and these letters also indicate the binary bit position of the information appearing on the particular lead line.

The numbers 1 through 4 in the lead designations represent the decimal number digit position, with 1 representing the most-significant digit position (10) and 4 representing the least-significant digit position (0.01). Thus, the reference indication YA1s means that that lead line carries information from the Y disc which is in the disc code in the most significant, or tens digit, position of that code and is the $s$ binary bit in the binary number representing the tens code. Considering, for example, the designation YA$q$, this indicates that the Y disc is providing the output, the disc code is being employed, and the information is the $q$ binary bit in the third most-significant decimal digit position, or tenths-of-an-inch information.

The contacts of relay 138 perform the function of selecting the X or Y code-wheel output. The actual code conversion and coarse-number comparing function is carried out by the arrangement of the connections of the register relay contacts to the code wheel selected, so that at six different comparing stations a potential is established either indicative of equality or of nonequality, and, if the latter, the polarity of the potential indicates the direction the table should be moved to establish equality.

Essentially, at each comparing station, four resistors are connected in series between a positive and a negative voltage supply. These, by way of example, are plus and minus 175 volts. If the junctions between the first and second resistors are connected to one arrangement of contacts, and the junction between the third and fourth resistors are connected to a second arrangement of contacts, then, if the first and second contact arrangements connect the respective junctions to ground or do not connect the respective junctions to ground, the voltage at the midpoint of the four resistors, or at the junction between the second and third resistors, will be substantially at ground potential. If one or the other alone of the contact arrangements grounds the junction to which it is coupled, then the potential at the junction between the second and third resistors will be positive or negative, depending on which of the contact arrangements are performing the grounding.

Illustrating the above, referring to FIGURE 7A, the first, second, third, and fourth resistors at the first comparing position are respectively designated as 160, 162A, 162B, and 160B. The resistors in the other comparing positions bear similar reference numerals with prime designations. The junction between resistors 160A and 162A are connected to either the X or Y code wheel via contacts of relay 138. As pointed out, the XA1$s$ or YA1$s$ position on the code wheel indicates a table position ten inches or more away from the origin point. The relay contacts on the tens relay, contacts $10_1$–2, connect the junction point between third and fourth resistors to ground when the tens relay is operated. Thus, junction point 164A between the second and third resistors will be either at substantially ground potential when the table is not at least ten inches away from origin position and the tens relay $10_1$ is not operated or when both of these conditions occur. However, if XA1$s$ or YA1$s$ are grounded on the code wheels and contacts $10_1$–2 are not operated, then junction 164 is at a positive potential. Conversely, if XA1$s$ or YA1$s$ are not grounded and contacts $10_1$–2 are operated, point 164A is at a negative potential.

The potentials at the six junction points 164A through 164F, resulting from the comparisons, are each respectively applied through six double Zener diodes 166A through 166F to the respective junctions between six series-connected resistors 170A through 170F. One end of the six series-connected resistors is the output terminal 168. The other end of the six series-connected resistors is connected to ground. The Zener diodes serve the function of only permitting application of a potential to the resistor string which is substantially different from ground potential. The resistor string functions to insure that the potential value which is applied closest to the output terminal establishes the voltage at the output terminal. The voltages applied to other lower junctions of the resistor string have a minimal effect. When the potential on one of the higher ones of the junction points 164A through 164F attains a value at substantially ground level, at which the double Zener diode coupling the junction point to the resistor string blocks further voltage application from that point, the next lower junction point potential which is other than substantially zero establishes the potential at the output terminal 168. Since the comparing positions, as well as their connection to the resistor string, are set up in an order corresponding to the order of digit significance, it will be seen that the table motion will be controlled successively by any differences between indicated and desired table position having decreasing dimensional significance.

Considering now the connections of the relay register contacts, connection is made from the junction between resistors 160A' and 162A' to normally closed contacts $1_4$–4 and to normally open contacts $1_3$–4 and $1_2$–7. The junction between resistors 160B' and 162B' is connected to normally closed contacts $1_3$–3 and normally open contacts $1_2$–6 and $1_4$–3. Normally closed contacts $1_4$–4 and $1_3$–3 are connected together and to contacts 138–6, which can select either XA2$q$ or YA2$q$. Contacts $1_3$–4 and $1_2$–7 are connected together to a connection between a normally open and a normally closed pair of contacts from each of contacts $10_1$–5 and $10_1$–6. The remaining normally open and normally closed pairs of contacts $10_1$–5 and $10_1$–6 are connected together and to contacts $1_2$–6 and $1_4$–3. The common point of contacts $10_1$–5 connects to the common point of double-throw contacts 138–7, which can select either XA2$p$ or YA2$p$. The common point of contacts $10_1$–6 is connected to the common point of contacts 138–8, which can select either XA2$r$ or YA2$r$.

The next lower comparing position will have the junction of resistors 160A" and 162A" connected to double-throw contacts $10_1$–4. The common point of double-throw contacts $1_2$–4 is connected to the normally closed contacts of $10_1$–4; the common point of double-throw contacts $1_2$–5 is connected to the normally open contacts of $10_1$–4. The junction between resistors 160B" and 162B" is connected to the common point of double-throw contacts $10_1$–3. The common point of double-throw contacts $1_2$–8 is connected to normally closed contacts of $10_1$–3. The common point of double-throw contacts $1_2$–3 is connected to the normally open contacts of $10_1$–3. The normally closed contacts of $1_2$–4, $1_2$–3, and the normally open contacts of $1_2$–5 and $1_2$–8 are connected together and to the common point of double-throw contacts 138–5 which select either XA2$s$ or YA2$s$. The normally open contacts of $1_2$–4 and the normally closed contacts of $1_2$–5 are connected together and to the normally closed contacts of $1_1$–4, a double-throw contact pair. The normally open contacts of $1_1$–4 are connected to the normally closed contacts of $1_2$–8 and the normally open contacts of $1_2$–3. The common point of contacts $1_1$–4 is connected to ground.

Considering the next lower comparing station, the junction of resistors 160A''' and 162A''' are connected to normally closed contacts $.1_4$–3 and normally open contacts $.1_3$–3 and $.1_2$–7. The junction between resistors 162B''' and 160B''' is connected to normally closed contacts $.1_3$–2 and to normally open contacts $.1_4$–2 and $.1_2$–6. Normally closed contacts $.1_4$–3 and $.1_3$–2 are connected to the common point of double-throw contacts 138–0, which select either XA3$q$ or YA3$q$. Normally open contacts $.1_3$–3 and $.1_2$–7 are connected to a normally open and a normally closed contact, respectively, of double-throw contacts $1_1$–5 and $1_1$–6. Normally open contacts $.1_4$–2 and $.1_2$–6 are connected together and to the remaining normally open and normally closed contacts, respectively, of $1_1$–5 and $1_1$–6. The common point of contacts $1_1$–5 connects to the common point of double-throw contacts 138–12, which select either XA3$p$ or YA3$p$. The common point of contacts $1_1$–6 is connected to the common point of double-throw contacts 128–13, which select XA3$r$ or YA3$r$.

The next lowest comparing position has the common terminal of double-throw contacts $1_1$–3 connected to the junction of resistors 160A'''' and 162A'''' and the common terminal of double-throw contacts $1_1$–2 connected to the junction of resistors 160B'''' and 162B''''. The common terminals of double-throw contacts $.1_2$–4 and $.1_2$–5, respectively, connect with the normally closed and normally open contacts $1_1$–3. The common terminals of double-throw contacts $.1_2$–2 and $.1_2$–3 are respectively connected to the normally closed and normally open contacts of $1_1$–2. The normally closed contacts of $.1_2$–4 and $.1_2$–3 and the normally open contacts of $.1_2$–5 and $.1_2$–2 are connected together and to the common terminal of double-throw contacts 138–9, which select either XA3$s$ or YA3$s$. The normally closed contacts of double-throw contacts $.1_1$–2 are connected to normally open contacts of $.1_2$–4 and normally closed contacts of $.1_2$–5. The normally open contacts of $.1_1$–2 are connected to the normally closed contacts of $.1_2$–2 and normally open contacts of $.1_2$–3. The common terminal of contacts $.1_1$–2 is grounded.

The lowest comparing position has resistor 162A''''' connected through another resistor 172 to the double-throw contacts 138–14, which connect to either XA4$q$ or YA4$q$. A resistor 174 connects resistor 162A''''' to contacts 138–15, which select either XA4$p$ or YA4$p$. Resistor 174 also connects through a resistor 176 to the common terminal of double-throw contacts $.1_1$–3. The normally closed one of these connects to plus 175 volts; the normally open one of these connects to minus 175 volts. Resistor 162A''''' is also connected through a resistor 180 to double-throw contacts 138–16, which select XA4$r$ and YA4$r$. Resistor 180 is connected through a resistor 182 to the common terminal of double-throw contacts $.1_1$–4. The normally open and normally closed one of these contacts, respectively, is connected to plus 175 volts and to minus 175 volts. Resistor 162B''''' is connected through a resistor 184 to a normally closed contact of double-throw contacts $.01_3$–5. A resistor 186 connects resistor 184 to minus 175 volts. A resistor 188 connects resistor 162B''''' to the normally closed contacts of double-throw contacts $.01_4$–4. Resistor 162B''''' is directly connected to the normally open contacts of $.01_4$–4. The common terminal of $.01_4$–4 is connected to the normally open contacts of $.01_3$–5. The common terminal of $.01_3$–5 is connected to ground. A resistor 190 connects resistor 188 to plus 175 volts. A resistor 192 connects resistor 162B''''' to normally open contacts $.01_2$–5. These contacts are also connected to ground.

A detailed explanation of how the coarse-number storage-relay contacts operate with all variations of codewheel positions to gradually transfer the establishment of the voltage at the output terminal 168 successively to each of the junction points 164A through 164F at the comparing positions would require an extremely lengthy and complicated explanation and would not materially assist in an understanding of this feature of the invention. It is believed, however, that by a showing and explanation of the logical equations used and from the previous explanation, the principles of operation will be clearly understood. It should be noted that the comparator arrangement shown and described herein is not the only one which can be used. Other codes and other types of position transducers may be employed without departing from the spirit and scope of the invention.

It will be recalled from the previous code tables that the code of the disc is the A code and the code of the punched paper tape is the B code. For A1 or B3, the subscripts stand for the decimal digit position with the tens or most-significant digit being represented by 1. Further, the letters $p$, $r$, $q$, and $s$ represent binary bit positions. The coarse error "C" will be ±1 or 0, depending on the sign of A–B. The operation of the tens, or first, comparing position was previously explained in detail. Using the representations just set forth, this may be expressed as $$C = A1s - B1s$$

A1$s$, of course, represents the output from the XA1$s$ or YA1$s$ brush leads. This is 1 or 0. B1$s$ represents the operation or not of the tens position relay register, which algebraically is 1 or 0.

If the above expression is zero due to both the A and B quantities being present or absent, then control shifts to the next comparing position. This may be expressed as:

$$A2p[(B2q+B2r)B1s-\overline{B}1s(B2p+B2r)]+A2q(\overline{B}2p\\-\overline{B}2q)+A2r[(B2q+B2r)\overline{B}1s-B1s(B2p+B2s)]$$

In the above expression, product terms, the [ ] and ( ) are all read as "and." The "+" is read as "or." The "—" is given its arithmetic sense. The meaning of the bar is "not" and is represented by a normally closed contact. Thus, B1s has a value "1" when a ten is present and a value "0" when a ten is not present. $\overline{B}1s$ has a value "1" when a ten is not present and a value "0" when a ten is present.

If the two above expressions are zero, then control is shifted to the next comparing position, or:

$$A2s(B1s-\overline{B}1s)(B2r-\overline{B}2r)-B2s(B1sB2r\\+\overline{B}1s\overline{B}2r)+\overline{B}2s(B1s\overline{B}2r+\overline{B}1sB2r)$$

If all of the above expressions are zero, then the next comparing position controls and is represented by:

$$A3p[(B3q+B3r)B2s-\overline{B}2s(B3p+B3r)]+A3q(\overline{B}3p\\-\overline{B}3r)+A3r[(B3q+B3r)\overline{B}2s-B2s(B3p+B3r)]$$

If all the above expressions are zero, then the next comparing position controls and may be expressed as:

$$[A3s(B2s-\overline{B}2s)(B3r-\overline{B}3r)+B3s(B2sB3r\\+\overline{B}2s\overline{B}3r)+\overline{B}3s(B2s\overline{B}3r+\overline{B}2sB3r)]$$

The last or lowest coarse-error comparing stage will then control if all the above equal zero. The lowest coarse-error comparison actually goes only to 0.02 inch. Comparisons less than this are made by the fine-error comparator.

$$[(1+\overline{A}4q)(A4r-A4p)][\overline{B}4s-B4s]\\+[(\overline{B}4r-B4r)][B4p+2\overline{B}4pB4q]$$

When all the above expressions are zero, then the fine-error comparator will control table motion.

Referring now to FIGURE 8, there may be seen a circuit of the mixer for applying the coarse- and fine-error signals to the X and Y clutches. The output terminal 168 is connected to apply the coarse-error signals to the grid of an amplifier tube 200, which is cathode coupled to a second grounded grid amplifier 202. The outputs from these two tubes are respectively applied to two cathode-follower tubes 204, 206. The outputs from the cathodes of these two cathode-follower tubes are respectively applied to a rectifier bridge 208 and also through two double Zener diodes 210, 212 to two pentode amplifier tubes 214, 216. The circuit arrangement is such that both a positive and a negative signal can be handled. Tube 214 is rendered conductive by positive signals; tube 216 is rendered conductive by negative signals. The rectifier bridge provides direct current to maintain a "coarse error" relay operative as long as there is a coarse error present.

The output of tubes 214 and 216 are applied through normally open contacts 140–4 and 140–5 of the "position-in-Y" relay to the forward-Y clutch 220, or reverse-Y clutch 222, or through normally open contacts 142–4 and 142–5 of the position-in-X relay to the forward-X clutch 224, or to the reverse-X clutch 226.

As previously explained in connection with FIGURE 2 of the drawings, a tachometer generator 228X, 228Y is coupled to each lead screw and generates an output voltage indicative of motion. The Y lead screw tachometer is connected into the circuit when the relay 138 is operated, closing normally open contacts 138–20 and 138–21. The X lead screw tachometer is connected into the circuit when the relay 138 is not operated through normally closed contacts 138–22 and 138–23. The generator output (for the selected axis, X or Y) is applied to the control grids of two cathode-coupled tubes 230, 232. The outputs of these tubes are respectively applied to two cathode-follower tubes 234, 236, as well as to two amplifier tubes 238, 240. These latter two amplifier tubes are connected to the outputs of tubes 214 and 216. The polarity of the output of the tachometer voltage opposes that of the tubes 214, 216 when the motion is in the direction tending to reduce the positional error. A small amount of tachometer generator voltage is also fed directly into tubes 214, 216.

The two cathode-follower tubes 234, 236 supply a rectifier bridge 241 with their output. The bridge supplies voltage to a resistor 242, which is connected in series with a speed-detecting relay 244. The function of the resistor is to reduce the sensitivity of the relay when it is connected in series therewith. A pair of normally open contacts 256–2 and a pair of normally closed contacts 252–1 are employed to shunt out the resistor 242 at the proper time, as will be explained later, so that the speed relay is sensitive when required and has a reduced sensitivity when this is necessary, also. The gain of tubes 238, 240 is increased soon after the speed first reaches zero, when (as will be explained later) relay 256 closes normally open contacts 256–5, and remains high until the relays are reset, as they will be eventually, after the motion has been completed.

Figures 9, 10:
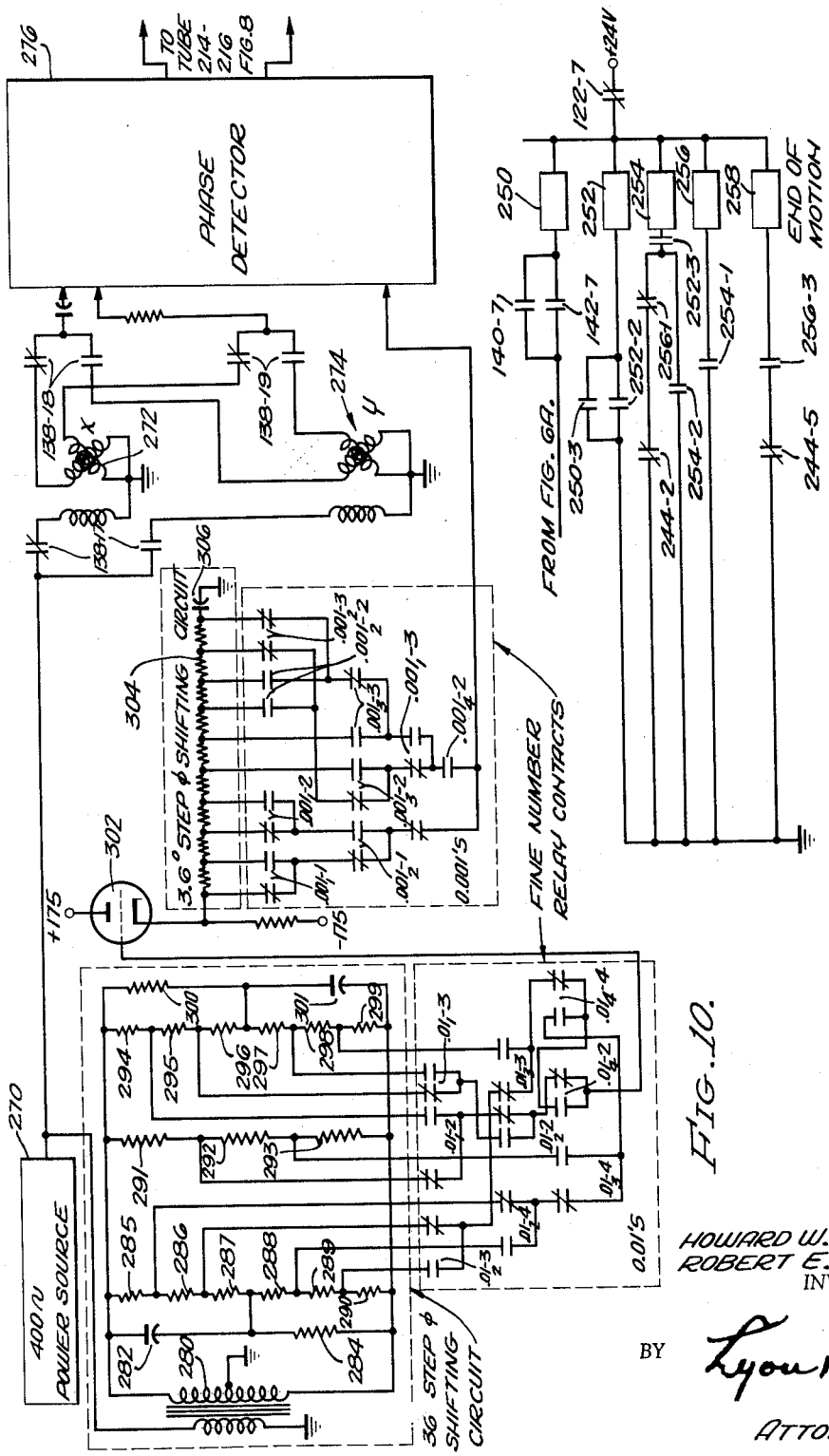
FIGURE 9 is a circuit diagram of the relay arrangement for sensing the stopping of the table.
FIGURE 10 is a circuit diagram of the fine error comparator.

Attention is directed at this time to FIGURE 9, which is a circuit diagram of the relays and the relay contact arrangement which became operative when the speed approaches zero. When, as explained in FIGURE 6A, a path is created to ground through sets of relay contacts, whereby either the position-in-X relay 142 or the position-in-Y relay 140 is operated, a path to ground is established also for operating a relay coil 250, either through the normally open contacts 140–7 or 142–7. This serves to close normally open contacts 250–3, whereby relay 252 connected thereto is energized and latches over its contact 252–2.

A fast operating relay 254 cannot operate over a path including contacts 252–3, which are now closed, normally closed contacts 256–1, and normally closed contacts 244–2, since these latter contacts are kept open until the speed relay 244 can be rendered inoperative for a brief instant. This happens the first time the table comes to a halt, after it passes the zero coarse-error region. Relay 254 then latches itself closed over its contacts 254–2. This will enable relay 256 to be operated over contacts 254–1. Relay 256 is a slow-acting relay having a delay on the order of 60 milliseconds; the machine-tool table will reverse its motion and attain a speed sufficient to operate relay 244 again before the slow-acting relay 256 can operate. As a result, relay 253 cannot operate even after contacts 256–3 are closed until relay 244, the speed relay, becomes inoperative a second time, enabling normally closed contacts 244–5 to then close. This second time occurs, as will be shown, when the table is in the desired position.

Now considering FIGURE 8, when relay 252 is operated, it opens its normally closed contacts 251–1, which otherwise shunt out the resistor 242 in series with speed relay 244. Thereby, the relay 244 is rendered less sensitive to respond to the voltage applied thereto. This condition prevails during the moving of the table and until relay 256 can be closed, which occurs soon after a coarse-error zero region has been passed the first time. The tachometer generator output voltage drops to zero when the table motion stops, temporarily de-energizing relay 244, then increases again and re-energizes relay 244 when the motion reverses. Just after that time, the contacts 256–2 close, and the resistor 242 is shunted out, so that relay 244 is made most sensitive. Simultaneously, the gain of tachometer-voltage amplifiers 238 and 240 is increased, due to the closure of contacts 256–5, so that the tachometer signal has more influence on the clutches and can greatly reduce the table speed.

When next the table enters the region of zero coarse error, relay 218 is de-energized, thereby closing (normally closed) contact 218–2, which (since contact 256–4 is already closed by that time) then short-circuits the coarse-error input of tube 200, so that coarse error has no further effect until various relays (particularly 256) are reset. By this time the table is well within 0.050″ of its destination; the phase-detector output is substantially proportional to whatever positional error remains, and tends to drive the table in the proper direction.

The machine-tool table thus moves slowly to the position at which the analog error signal is zero, where the table stops. This second time the speed relay 244 becomes inoperative, relay 258 is rendered operative. Relay 258 is the one that orders the actual drilling operation to occur if a drill command was read and noted by the relay structure shown in FIGURES 6A and 6B. This relay initiates the feeding down of the spindle. The operation which occurs after drilling is described in connection with FIGURES 6A and 6B.

FIGURE 10 is a circuit diagram of the analog error comparator. This includes a 400-cycle power source 270, which supplies power to a phase-shifting circuit and to one or the other of a pair of angle resolvers 272, 274. Double-throw contacts 138–17 determine which of the two angle resolvers receive the 400-cycle power. The angle resolver 272 is coupled to be driven from the X lead screw and the angle resolver 274 is coupled to be driven from the Y lead screw. Thus, when the X–Y relay 138 is not operated, the X resolver 272 will receive power. Output from one or the other of these resolvers, as determined by relay 138, is applied to a phase detector 276 through double-throw contacts 138–18 and 138–19. The angle resolvers are well-known circuitry, effectively comprising a transformer having a stationary primary winding and rotatable secondary winding. The output from the secondary winding is a voltage which varies with the position of the secondary winding and is used to establish the position of the shaft from which it is driven.

The 400-cycle power source 270 applies its output to a two-stage phase-shifting network, also. The first stage provides a 400-cycle output wave whose phase is shifted 36° relative to the input for every 0.01 inch established in the registers. The first phase-shifting circuit includes an input transformer 280, across the center-tapped secondary winding of which there is connected a phase-shift network. This includes five branches. The first branch includes a condenser 282 in series with a resistor 284. The second branch includes six series-connected resistors 285, 286, 287, 288, 289, 290. The junction of resistors 287 and 288 is connected to the junction of condenser 280 and resistor 284. The third branch includes three series-connected resistors 291, 292, 293. The fourth branch includes six series-connected resistors 294, 295, 296, 297, 298, 299. The fifth branch includes a resistor 300 in series with a condenser 301. The junction of the resistor 300 and condenser 301 is connected to the junction of resistors 296 and 297.

The above-described circuit will be recognized as two-phase-shift circuits, with taps for selecting a wave having a desired phase shift. The selection is made by contacts of relays $.01_1$ through $.01_4$. Thus, the normally open contacts and the normally closed contacts of the pair $.01_2–3$ are respectively connected to the junctions between resistors 289, 290 and resistors 286, 287. The normally open contacts and the normally closed contacts of the pair $.01_2–4$ are respectively connected to the junction between resistors 288, 289 and 285, 286. The normally closed and normally open contacts of the pair $.01_1–2$ are respectively connected to the junctions between resistors 291, 292 and 294, 295. The normally closed and normally open contacts of the pair $.01_1–3$ are respectively connected to the junctions between resistors 285, 296 and 297, 298.

The normally closed contacts and normally open contacts of the pair $.01_3–3$ are respectively connected to the single pole of $.01_2–3$ and to the junction of resistors 298 and 299. The normally closed contacts and normally open contacts of the pair $.01_3–4$ are respectively connected to the common point of contacts $.01_2–4$ and to the junction between resistors 292 and 293.

The poles of contacts $.01_1–2$ and of $.01–3$ are respectively connected to the normally closed and normally open contacts of double-throw contacts $.01_2–2$. The poles of $.01_3–3$ and of $.01_3–4$ are connected, respectively, to the normally closed contacts and normally open contacts of double-throw contacts $.01_4–4$. The poles of contacts $.01_2–2$ and $.01_4–4$ are respectively connected to the normally closed and normally open contacts of double-throw contacts $.01_4–2$. The pole of $.01_4–2$ is connected to the second phase-shift circuit by being coupled to the grid of a cathode-follower tube 302.

The cathode of tube 302, effectively, has connected thereto a multitapped resistor 304 in series with a condenser 306, which is connected to ground. Whatever multiple of 36° phase shift was selected by the contacts of relays $0.01_1$ through $0.01_4$ is augmented in 3.6 degree steps by operation of the contacts of the $.001_1$ through $.001_4$ relays. The multitapped resistor 304 actually consists of nine resistors connected in series. The first of these resistors is connected between the normally closed and normally open contacts of double-throw contacts $.001_1–1$. The third of these resistors is connected between the normally closed and normally open contacts of double-throw contacts $.001_1–2$. The fifth of these resistors is connected between the normally open contacts of double-throw contacts $.001_3–2$ and $.001_3–3$. The seventh of these resistors is connected between the normally open contacts of double-throw contacts $.001_2–2$ and $.001_2–3$. The normally closed contacts of $.001_2–2$ and $.001_2–3$ are connected to the ninth resistor.

The poles of $.001_1–1$ and $.001_1–2$ are connected, respectively, to the normally closed and normally open contacts of double-throw contacts $.001_2–1$. The poles of $.001_2–2$ and $.001_2–3$ are respectively connected to the normally closed contacts of $.001_3–2$ and $.001_3–3$. The poles of $.001_3–2$ and $.001_3–3$ are respectively connected to the normally closed and normally open contacts of double-throw contacts $.001_1–3$. The poles of $.001_2–1$ and $.001_1–3$ are respectively connected to the normally closed and normally open contacts of $.001_4–2$. The output of the phase-shifting networks appears on the pole of contacts $.01_4–2$. This is connected to the well-known phase-detecting circuit, which provides an output to the mixer circuitry shown on FIGURE 8. This output will be a voltage which has a polarity indicative of whether the table position exceeds that called for by the number read from the punched paper tape or vice versa. When the phase-detector output is zero, the table is halted.

The amplitude of the signals established, as previously indicated, is such that the coarse-error signal overrides tachometer generator and analog error signals. The analog error signal may be larger or smaller than the tachometer generator signal. When the tachometer generator signal is larger, it tends to slow down the table motion regardless of table direction, i.e., it always opposes the existing direction of motion. When the speed has dropped low enough, the analog error signal will prevail, but finally both analog error signal and the tachometer signal will dwindle to insignificance as the table slowly approaches its destination.

There has accordingly been explained and shown herein a novel, useful arrangement for automatically point positioning a machine-tool table, or any other moving body, at a desired location from an origin point from coordinate information as to the desired location. While the embodiment of the invention was described for an automatic multiple-spindle press, it will be appreciated hat this is by way of exemplification and not to be construed as a limitation upon the invention.

We claim:

1. In a system for positioning a body at a desired location at a distance from an origin point recorded as a digital value having coarse and fine values, means for moving said body from said origin point, digital transducer means actuated by said means for moving to provide a digital output indicative of the distance of said body from said origin point, analog transducer means actuated by said means for moving to provide an analog output representative of the location of said body in terms of the smallest digital dimension employed, tachometer generator means actuated by said means for moving to provide an output responsive to motion of said body, first means for comparing said digital transducer means output with said digital value and providing an output indicative of any difference, means for applying said recorder digital value and said digital transducer means output to said first means for comparing, means for converting the lowest significant portions of said digital value to a representative analog value, second means for comparing said analog transducer output and said representative analog value to provide an output representative of any difference, means for applying said analog transducer output and said representative analog value to said second means for comparing, a mixer circuit, means for controlling said means for moving said body responsive to said mixer circuit output, means for applying said analog and digital comparing means outputs to said mixer circuit to control said means for moving first responsive to said digital comparing means output and then to said analog comparing means output, and means to apply the output of said tachometer generator means to said mixer circuit in opposition to the outputs of said analog and digital comparing means.

2. In a system as recited in claim 1 wherein there is included relay means responsive to said digital comparing means output reaching substantially zero and said tachometer generator output dropping to substantially zero to prevent further output from said digial comparing means from reaching said mixer circuit.

3. In a system as recited in claim 1 wherein there is included means responsive to said tachometer generator output dropping to substantially zero to increase the value of any tachometer generator output occurring thereafter and which is in said mixer circuit.

4. In a system for positioning a body at a desired location recorded as the digital values of the two co-ordinates of said location in a two co-ordinate system, first means to move said body along a first of said co-ordinates, first digital transducer means to provide a digital output indicative of the location of said body along a first of said co-ordinates responsive to said first means to move, second means to move said body along a second of said co-ordinates, second digital transducer means to provide a digital output indicative of the location of said body along the second of said co-ordinates responsive to said second means to move first analog transducer means responsive to said first means to move to provide an analog output indicative of the location of said body along said first co-ordinate in terms of the smallest digital dimensions employed, second analog transducer means responsive to said second means to move to provide an analog output indicative of the location of said body along said second co-ordinate in terms of the smallest digital dimension employed, digital comparing means for comparing two digital quantities and providing an output representative of any difference, means for converting the lowest significant portions of a digital value to an analog quantity representative thereof, means to apply the one of said two recorded digital values for said one co-ordinate to said digital comparing means and to said means for converting, means for applying the output of said first transducer to said digital comparing means, analog means for comparing two analog quantities and providing an output representative of any difference, means for applying the output of said first analog transducer and said means for converting to said analog comparing means, a mixer circuit, means for applying said digital and analog comparing means output to said mixer circuit to provide an output representative of said digital comparing means output whenever present and otherwise of said analog comparing means output, means for applying the output of said mixer circuit to control said first means for moving, means to apply the other of said two digital values to said digital comparing means and to said means for converting in place of said one digital value, means for applying the output of said second digital transducer in place of said first digital transducer to said digital comparing means, means for applying said second analog transducer output in place of that of said first analog transducer and the output of said means for converting to said analog comparing means, and means to apply said mixer circuit output to said second means for moving in place of said first means for moving.

5. A system for positioning a machine-tool table at a desired location expressed as digital values of the two co-ordinates of said location in a first and second or two co-ordinate system comprising a register, means to enter one of said digital values into said register, means for identifying for which of said co-ordinates the value entered into said register applies, first and second means for respectively moving said table along said first and second co-ordinates, first and second digital transducer means to respectively provide first and second digital outputs representative of the location of said table respectively along said first and second co-ordinates, means for actuating said first and second digital transducer means respectively responsive to said first and second means for respectively moving said table along said first and second co-ordinates, first and second analog transducer means respectively responsive to said first and second means to move to provide respective analog outputs indicative of the location of said table along said first and second co-ordinates in terms of the smallest digital dimensions employed, digital comparing means for comparing two digital quantities and providing an output representative of any difference, said digital comparing means having two inputs one of which is actuated by said register, means for converting the lowest significant portions of a digital value in said register to an analog quantity representative thereof, analog comparing means for comparing two analog quantities and providing an output representative of any difference, said analog comparing means having two inputs one of which is actuated by said means for converting, a mixer circuit coupled to receive the outputs of said digital and analog comparing means and to provide an output responsive to said digital comparing means output until it is reduced to zero, and means actuated responsive to said means for identifying to which of said two co-ordinates said digital value applies to connect the corresponding one of said first and second digital transducer means outputs to said other digital comparing means input, the corresponding one of said first and second analog transducer means outputs to said other analog comparing means input and the corresponding one of said first and second means for moving said table responsive to said mixer circuit output.

6. A system as recited in claim 5 wherein said first and second analog transducer means respectively include angle resolver means to provide a wave shape whose phase relative to a reference phase is indicative of the location of said body, said means for converting includes a phase-shifting network having a plurality of taps for selecting wave shapes having different phases relative to a reference phase, and means for selecting one of said taps responsive to the value of the lowest significant portions of a digital value.

7. A system as recited in claim 5 wherein said digital comparing means includes for different digital positions first, second, third, and fourth resistors connected in series, means to apply equal and oppositely poled potentials to the first and fourth resistors, means coupled to the junctions between said first and second and said third and fourth resistors for establishing the potential of the junction between the second and third resistors at a potential substantially at a middle value between that of said equal and oppositely poled potentials when the digital values being compared are equal and at other values when the digital values are unequal, a plurality of series-connected resistors one end of which is the output terminal, and means to couple each junction between a third and fourth resistor to a different junction between each of said plurality of resistors, the order of the coupling by said means for coupling being determined by the significance of the digits being compared with the most significant being closest to said output terminal.

8. A system for positioning a machine-tool table, which is relatively independently movable along a first and a second co-ordinate, from a digital value representative of the location on a co-ordinate it is desired to position said table, said system comprising means for identifying to which of said first or second co-ordinates said digital value applies, a first and a second means for respectively moving said table along said first and said second co-ordinates, first and second digital transducer means to respectively provide first and second digital outputs representative of the location of said table respectively along said first and second co-ordinate responsive respectively to said first and second means for moving, first and second analog transducer means to provide respective analog outputs indicative of the location of said table along said first and second co-ordinates in terms of the smallest digital dimensions employed responsive respectively to said first and second means for moving, digital comparing means for comparing two digital quantities and providing an output representative of any difference, said digital comparing means having two inputs to one of which said digital value is applied, means for converting the lowest significant portions of a digital value in said register to an analog quantity representative thereof, analog comparing means for comparing two analog quantities and providing an output representative of any difference, said analog comparing means having two inputs one of which is actuated by said means for converting, a mixer circuit coupled to receive the outputs of said digital and analog comparing means and to provide an output responsive to said digital comparing means output until it is reduced to zero, a first and second tachometer generator respectively coupled to be driven by said first and second means for respectively moving said table, means actuated responsive to said means for identifying to which of said two co-ordinates said digital value applies to connect the corresponding one of said first and second digital transducer means outputs to said other digital comparing means input, the corresponding one of said first and second analog transducer means outputs to said other analog comparing means input, the corresponding one of said first and second tachometer generator outputs to said mixer circuits in opposition to the other inputs thereto, and the mixer circuit output to the corresponding one of said first and second means for moving said table, means responsive to the output of the one of said tachometer generators coupled to said mixer circuit becoming substantially zero to thereafter increase the amplitude of the tachometer generator output applied to said mixer circuit to slow down said table velocity, and means responsive to said table motion terminating to enable subsequent operations of said machine tool.

9. A system for controlling a multiple-spindle automatic drill press, having a table relatively independently movable along a first and a second co-ordinate, from a first digital value representative of the location on a co-ordinate it is desired to position said table, and a second digital value representative of the spindle desired to be employed comprising means for establishing a digital value representing the identity of a spindle at the drilling position of said automatic drill press, first means for comparing said value representing spindle identity with said second digital value, means to successively move each of said spindles into drilling position until said first means for comparing indicates an identity, means for identifying to which of said first or second co-ordinates said first digital value applies, first and second means for respectively moving said table along said first and second co-ordinates, first and second digital transducer means respectively responsive to said first and second means for moving to respectively provide first and second digital outputs representative of the location of said table respectively along said first and second co-ordinates, first and second analog transducer means respectively responsive to said first and second means for moving to provide respective analog outputs indicative of the location of said table along said first and second co-ordinates in terms of the smallest digital dimensions employed, digital comparing means for comparing two digital quantities and providing an output representative of any difference, said digital comparng means having two inputs to one of which said digital value is applied, means for converting the lowest significant portions of a digital value in said register to an analog quantity representative thereof, analog comparing means for comparing two analog quantities and providing an output representative of any difference, said analog comparing means having two inputs one of which is actuated by said means for converting, a mixer circuit coupled to receive the outputs of said digital and analog comparing means and to provide an output responsive to said digital comparing means output until it is reduced to zero, and means actuated responsive to said means for identifying to which of said first or second co-ordinates said first digital value applies to connect the corresponding one of said first and second digital transducer means outputs to said other digital comparing means input, the corresponding one of said analog transducer means outputs to said other analog comparing means input and the corresponding one of said first and second means for moving said table to said mixer means output.

References Cited in the file of this patent

UNITED STATES PATENTS

| | | |
|---|---|---|
| 2,537,770 | Livingston et al. | Jan. 9, 1951 |
| 2,741,732 | Cunningham | Apr. 10, 1956 |
| 2,784,359 | Kamm | Mar. 5, 1957 |
| 2,838,963 | Good et al. | June 17, 1958 |
| 2,839,711 | Tripp | June 17, 1958 |
| 2,876,650 | Sangster | Mar. 10, 1959 |
| 2,927,258 | Lippel | Mar. 1, 1960 |

FOREIGN PATENTS

| | | |
|---|---|---|
| 1,110,544 | France | Oct. 12, 1955 |

UNITED STATES PATENT OFFICE
CERTIFICATE OF CORRECTION

Patent No. 3,063,311                          November 13, 1962

Howard W. Beckwith et al.

It is hereby certified that error appears in the above numbered patent requiring correction and that the said Letters Patent should read as corrected below.

Column 2, line 71, for "165B" read -- 156B --; column 6, lines 20 and 21, for "secondary" read -- second --; column 8, line 40, for "thorugh" read -- through --; column 10, line 39, for "through" read -- though --; column 11, line 3, for "constains" read -- contains --; column 13, line 67, for "thereupon" read -- thereon --; column 14, line 18, for "tap" read -- tape --; line 32, for "command" read -- commanded --; line 44, for "contacts and contacts 244-3, 152-2" read -- contacts 244-3 and contacts 152-2 --; line 64, for "adidtion" read -- addition --; column 15, line 17, after "244-4" insert -- of --; line 46, for "commond" read -- command --; line 74, for "number" read -- numbers --; column 17, line 74, for "YAq" read -- YA3q --; column 18, line 33, for "160" read -- 160A --; column 19, line 56, for "138-0" read -- 138-10 --; line 67, for "128-13" read -- 138-13 --; column 22, line 37, for "contact" read -- contacts --; column 23, line 60, after "two" strike out the hyphen; line 75, for "285" read -- 295 --; column 24, line 23, for "augmeented" read -- augmented --; column 25, line 18, for "recorder" read -- recorded --; column 28, line 33, for "comparng" read -- comparing --.

Signed and sealed this 29th day of October 1963.

(SEAL)
Attest:

ERNEST W. SWIDER                            EDWIN L. REYNOLDS

Attesting Officer                               Acting Commissioner of Patents